（12）United States Patent
Iwakura et al.

(10) Patent No.: US 9,756,386 B2
(45) Date of Patent: Sep. 5, 2017

(54) CONTENT UTILIZATION SUPPORT METHOD, COMPUTER-READABLE RECORDING MEDIUM, AND CONTENT UTILIZATION SUPPORT APPARATUS

(71) Applicant: FUJITSU LIMITED, Kawasaki-shi, Kanagawa (JP)

(72) Inventors: Satoko Iwakura, Kawasaki (JP); Yutaka Iwayama, Kawasaki (JP); Takao Mohri, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/137,387

(22) Filed: Apr. 25, 2016

(65) Prior Publication Data
US 2016/0323639 A1  Nov. 3, 2016

(30) Foreign Application Priority Data
May 1, 2015  (JP) ................................ 2015-094028

(51) Int. Cl.
| G09B 7/02 | (2006.01) |
| H04N 21/442 | (2011.01) |
| H04N 21/45 | (2011.01) |
| H04N 21/8543 | (2011.01) |

(52) U.S. Cl.
CPC ......... *H04N 21/44204* (2013.01); *G09B 7/02* (2013.01); *H04N 21/44222* (2013.01); *H04N 21/4532* (2013.01); *H04N 21/8543* (2013.01)

(58) Field of Classification Search
None
See application file for complete search history.

(56) References Cited

U.S. PATENT DOCUMENTS

| 2009/0202218 A1 | 8/2009 | Inatomi |
| 2012/0066705 A1 | 3/2012 | Harada |
| 2012/0302355 A1* | 11/2012 | Thakkar ................... A63F 13/12 463/42 |

(Continued)

FOREIGN PATENT DOCUMENTS

| JP | 2007-295138 | 11/2007 |
| JP | 2008-17235 | 1/2008 |

(Continued)

*Primary Examiner* — Eileen Adams
(74) *Attorney, Agent, or Firm* — Oblon, McClelland, Maier & Neustadt, L.L.P.

(57) ABSTRACT

A content utilization support method executed by a computer, including detecting a section of a content based on operation information on the content and user information, the detected section being a section whose play frequency by single user is more than a predetermined value, comparing a first distribution that is a distribution of attribute information of users in a first group and a second distribution that is a distribution of attribute information of users in a second group, the first group being a group of the users whose play frequency of the detected section is more than predetermined value, the second group being a group of the users whose play frequency of the detected section is equal to or less than predetermined value, and outputting information that indicates the detected section and attribute information whose difference between the first distribution and the second distribution is larger than a predetermined threshold.

15 Claims, 34 Drawing Sheets

(56) References Cited

U.S. PATENT DOCUMENTS

2013/0054628 A1* 2/2013 Meierhoefer ........... G06F 17/30
707/758
2014/0356843 A1* 12/2014 Yang ........................ G09B 5/00
434/362

FOREIGN PATENT DOCUMENTS

| JP | 2008-53824 | 3/2008 |
| JP | 2009-194767 | 8/2009 |
| JP | 2013-223229 | 10/2013 |
| WO | WO 2010/143388 A1 | 12/2010 |

* cited by examiner

FIG. 2

| TARGET CONTENT | USER | ACTION | POSITION | TIME AND DATE |
|---|---|---|---|---|
| V0001 | A | REPLAY START | 00:00 | 2014/1/20 19:00:00 |
| V0001 | A | STOP | 03:00 | 2014/1/20 19:03:00 |
| V0001 | A | REWIND | 03:00 | 2014/1/20 19:03:01 |
| V0001 | A | STOP | 02:30 | 2014/1/20 19:03:02 |
| V0001<br>V001 | A<br>A | REPLAY START<br>STOP | 02:30<br>10:00 | 2014/1/20 19:03:03<br>2014/1/20 19:10:33 |
| V0001 | B | REPLAY START | 00:00 | 2014/1/20 19:10:40 |
| ⋮ | ⋮ | ⋮ | ⋮ | ⋮ |

| TARGET CONTENT | SECTION | REPLAY FREQUENCY | REPLAYING USER | FOCUS VALUE |
|---|---|---|---|---|
| V0001 | 00:00 TO 00:01 | 4 | A,B,C,D | 1 |
| V0001 | 00:01 TO 00:02 | 4 | A,B,C,D | 1 |
| ⋮ | ⋮ | ⋮ | ⋮ | ⋮ |
| V0001 | 02:30 TO 02:31 | 8 | A(2),B(4),C,D | 2 |
| ⋮ | ⋮ | ⋮ | ⋮ | ⋮ |

| REPEATED SECTION No. | TARGET CONTENT | REPEATED SECTION | REPEATEDLY REPLAYING USER | FOCUS VALUE |
|---|---|---|---|---|
| 1 | V0001 | 02:30 TO 03:00 | A(2),B(4) | 2 |
| ⋮ | ⋮ | ⋮ | ⋮ | ⋮ |

FIG. 6

| No. | ATTRIBUTE NAME | POSSIBLE VALUE OF ATTRIBUTE |
|---|---|---|
| 1 | PRESENCE OR ABSENCE OF CAPTIONS | WITH CAPTIONS, WITHOUT CAPTIONS |
| 2 | PRESENCE OR ABSENCE OF TEST BROWSING | WITH TEST BROWSING, WITHOUT TEST BROWSING |
| ⋮ | ⋮ | ⋮ |

FIG. 7

| USER | ATTRIBUTE NAME | ATTRIBUTE VALUE |
|---|---|---|
| A | PRESENCE OR ABSENCE OF CAPTIONS | PRESENT |
| A | PRESENCE OR ABSENCE OF TEST BROWSING | ABSENT |
| ⋮ | ⋮ | ⋮ |
| B | PRESENCE OR ABSENCE OF CAPTIONS | ABSENT |
| B | PRESENCE OR ABSENCE OF TEST BROWSING | ABSENT |
| ⋮ | ⋮ | ⋮ |

FIG. 8

| No. | ATTRIBUTE NAME | POSSIBLE VALUE OF ATTRIBUTE |
|---|---|---|
| 3 | SCORE OF LAST ASSIGNMENT SUBMITTED IN SAME COURSE | NOT SUBMITTED, EXCELLENT, GOOD, FAIR, POOR |
| 4 | AVERAGE FINAL PERFORMANCE OF COURSES TAKEN | NOT TAKEN, EXCELLENT, GOOD, FAIR, POOR |
| ⋮ | ⋮ | ⋮ |

| USER | ATTRIBUTE NAME | ATTRIBUTE VALUE |
|---|---|---|
| A | SCORE OF LAST ASSIGNMENT SUBMITTED IN SAME COURSE | FAIR |
| A | AVERAGE FINAL PERFORMANCE OF COURSES TAKEN | GOOD |
| ⋮ | ⋮ | ⋮ |
| B | SCORE OF LAST ASSIGNMENT SUBMITTED IN SAME COURSE | EXCELLENT |
| B | AVERAGE FINAL PERFORMANCE OF COURSES TAKEN | EXCELLENT |
| ⋮ | ⋮ | ⋮ |

| No. | ATTRIBUTE NAME | POSSIBLE VALUE OF ATTRIBUTE |
|---|---|---|
| 5 | GENDER | MALE, FEMALE |
| 6 | AGE | AGE 17 OR YOUNGER, AGE 18-24, AGE 25-59, AGE 60 OR OLDER |
| ⋮ | ⋮ | ⋮ |

| USER | ATTRIBUTE NAME | ATTRIBUTE VALUE |
|---|---|---|
| A | GENDER | FEMALE |
| A | AGE | AGE 18-24 |
| ⋮ | ⋮ | ⋮ |
| B | GENDER | MALE |
| B | AGE | AGE 17 OR YOUNGER |
| ⋮ | ⋮ | ⋮ |

FIG. 20

| No. | ATTRIBUTE NAME | POSSIBLE VALUE OF ATTRIBUTE |
|---|---|---|
| 1 | PRESENCE OR ABSENCE OF CAPTIONS | WITH CAPTIONS, WITHOUT CAPTIONS |
| 2 | PRESENCE OR ABSENCE OF TEST BROWSING | WITH TEST BROWSING, WITHOUT TEST BROWSING |
| 3 | SCORE OF LAST ASSIGNMENT SUBMITTED IN SAME COURSE | NOT SUBMITTED, EXCELLENT, GOOD, FAIR, POOR |
| 4 | AVERAGE FINAL PERFORMANCE OF COURSES TAKEN | NOT TAKEN, EXCELLENT, GOOD, FAIR, POOR |
| 5 | GENDER | MALE, FEMALE |
| 6 | AGE | AGE 17 OR YOUNGER, AGE 18-24, AGE 25-59, AGE 60 OR OLDER |
| ⋮ | ⋮ | ⋮ |

FIG. 21

| COMBINATION OF ATTRIBUTE NAMES | POSSIBLE VALUE OF ATTRIBUTE |
|---|---|
| No.1 | WITH CAPTIONS, WITHOUT CAPTIONS |
| No.2 | WITH TEST BROWSING, WITHOUT TEST BROWSING |
| No.1 × No.2 | WITH CAPTIONS × WITH TEST BROWSING<br>WITH CAPTIONS × WITHOUT TEST BROWSING<br>WITHOUT CAPTIONS × WITH TEST BROWSING<br>WITHOUT CAPTIONS × WITHOUT TEST BROWSING |
| ⋮ | ⋮ |

FIG. 22

| ATTRIBUTE COUNT No. | REPEATED SECTION No. | COMBINATION OF ATTRIBUTE NAMES | POSSIBLE VALUE OF ATTRIBUTE | NUMBER OF REPEATEDLY REPLAYING USERS | NUMBER OF NON-REPEATEDLY REPLAYING USERS |
|---|---|---|---|---|---|
| 1 | 1 | No.1 | WITH CAPTIONS | 80 | 500 |
| | | | WITHOUT CAPTIONS | 20 | 500 |
| 2 | 1 | No.2 | WITH TEST BROWSING | 35 | 350 |
| | | | WITHOUT TEST BROWSING | 65 | 650 |
| 3 | 1 | No.1 × No.2 | WITH CAPTIONS × WITH TEST BROWSING | 30 | 300 |
| | | | WITH CAPTIONS × WITHOUT TEST BROWSING | 50 | 500 |
| | | | WITHOUT CAPTIONS × WITH TEST BROWSING | 5 | 50 |
| | | | WITHOUT CAPTIONS × WITHOUT TEST BROWSING | 15 | 150 |
| ... | ... | ... | ... | ... | ... |

OBSERVED VALUE O

|  | WITH CAPTIONS | WITHOUT CAPTIONS | TOTAL |
|---|---|---|---|
| NUMBER OF REPEATEDLY REPLAYING USERS | 80 | 20 | 100 |
| NUMBER OF NON-REPEATEDLY REPLAYING USERS | 500 | 500 | 1000 |
| TOTAL | 580 | 520 | 1100 |

EXPECTED VALUE E

|  | WITH CAPTIONS | WITHOUT CAPTIONS | TOTAL |
|---|---|---|---|
| NUMBER OF REPEATEDLY REPLAYING USERS | 52.7 | 47.3 | 100 |
| NUMBER OF NON-REPEATEDLY REPLAYING USERS | 527.3 | 472.7 | 1000 |
| TOTAL | 580 | 520 | 1100 |

FIG. 26

| ATTRIBUTE COUNT No. | REPEATED SECTION No. | COMBINATION OF ATTRIBUTE NAMES | POSSIBLE VALUE OF ATTRIBUTE | NUMBER OF REPEATEDLY REPLAYING USERS | NUMBER OF NON-REPEATEDLY REPLAYING USERS | $\chi^2$ VALUE | SIGNIFICANT DIFFERENCE |
|---|---|---|---|---|---|---|---|
| 1 | 1 | No.1 | WITH CAPTIONS | 80 | 500 | 31.6 | 1 |
|   |   |      | WITHOUT CAPTIONS | 20 | 500 |   |   |
| 2 | 1 | No.2 | WITH TEST BROWSING | 35 | 350 | 0 | 0 |
|   |   |      | WITHOUT TEST BROWSING | 65 | 650 |   |   |
| 3 | 1 | No.1 × No.2 | WITH CAPTIONS × WITH TEST BROWSING | 30 | 300 | 0 | 0 |
|   |   |      | WITH CAPTIONS × WITHOUT TEST BROWSING | 50 | 500 |   |   |
|   |   |      | WITHOUT CAPTIONS × WITH TEST BROWSING | 5 | 50 |   |   |
|   |   |      | WITHOUT CAPTIONS × WITHOUT TEST BROWSING | 15 | 150 |   |   |
| ... | ... | ... | ... | ... | ... | ... | ... |

FIG. 28
Applying the definition
Mechanics:
·put the list in increasing order
·identify the place that is p% of the way from the bottom of the list
·if that's a place on the list,take the number in that place,if not take the next one up
Practice:0,2,4,7,7,12
Find the median. 
50% of the way into the list is 0.5 × 6=3placesm20 median=4.
Compare with the "conventional" median of 5.5:the two are not the same!
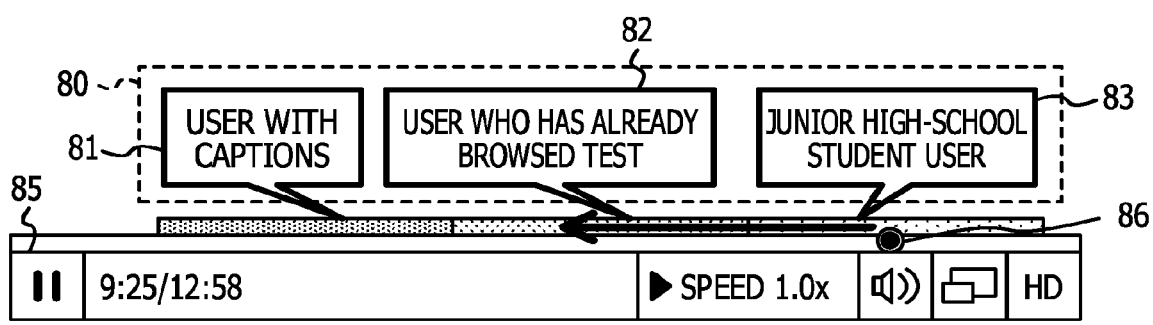

CONTENT UTILIZATION SUPPORT METHOD, COMPUTER-READABLE RECORDING MEDIUM, AND CONTENT UTILIZATION SUPPORT APPARATUS

CROSS-REFERENCE TO RELATED APPLICATION

This application is based upon and claims the benefit of priority of the prior Japanese Patent Application No. 2015-094028, filed on May 1, 2015, the entire contents of which are incorporated herein by reference.

FIELD

The embodiments discussed herein are related to a content utilization support method, a computer-readable recording medium, and a content utilization support apparatus.

BACKGROUND

In recent years, with the growth of the Internet, there have increased opportunities to download contents such as videos from a content distribution server connected to a communication line such as the Internet, and to browse the downloaded content using a mobile terminal such as a smartphone or an information terminal such as a personal computer.

In such content browsing using the communication line, the content distribution server, for example, may collect browsing information such as the gender of a user browsing the content, a replay frequency of the content, and replayed sections. The collected content browsing information is used to present recommended contents to the user, to create a content that summarizes sections to which the user may pay attention, to understand the viewing tendency of the user, and to do the like.

The related techniques are disclosed in, for example, Japanese Laid-open Patent Publication Nos. 2008-53824, 2013-223229, and 2009-194767 and International Publication Pamphlet No. WO2010/143388.

SUMMARY

According to an aspect of the invention, a content utilization support method executed by a computer, including detecting a section of a content based on operation information on the content and user information, the detected section being a section whose play frequency by single user is more than a predetermined value, the operation information including a played section of the content, the user information including one or more kinds of attribute information of the user who has played the played section, comparing, for each of the one or more kinds of attribute information, a first distribution that is a distribution of attribute information of users in a first group and a second distribution that is a distribution of attribute information of users in a second group, the first group being a group of the users whose play frequency of the detected section is more than predetermined value, the second group being a group of the users whose play frequency of the detected section is equal to or less than predetermined value, and outputting information that indicates the detected section and the one or more kinds of attribute information whose difference between the first distribution and the second distribution is larger than a predetermined threshold based on the comparing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a content browsing log table;

FIG. 6 is a diagram illustrating an example of an action attribute definition table;

FIG. 7 is a diagram illustrating an example of an action attribute value table;

FIG. 8 is a diagram illustrating an example of a performance attribute definition table;

FIG. 10 is a diagram illustrating an example of a user profile attribute definition table;

FIG. 11 is a diagram illustrating an example of a user profile attribute value table;

FIG. 20 is a diagram illustrating an example of an attribute table;

FIG. 21 is a diagram illustrating an example of a combination attribute table;

FIG. 22 is a diagram illustrating an example of an attribute count table;

FIG. 26 is a diagram illustrating an example of an attribute count table, to which presence or absence of a chi-square value and a significant difference is added;

FIG. 28 is a diagram illustrating an example of support information displayed on the student terminal according to the first embodiment;

DESCRIPTION OF EMBODIMENTS

In a conventional method for analyzing browsing information, a section repeatedly replayed by a user, for example, is just uniformly regarded as an attention section in which the user has interest.

Therefore, in the conventional method for analyzing browsing information, it is difficult to understand the reason for the user's attention, such as why a specific section of a content is repeatedly replayed.

As one aspect, it is an object of the embodiments to present support information for determining why a repeat operation is performed for a section of content subjected to the repeat operation.

Hereinafter, with reference to the drawings, detailed description is given of an example of embodiments of the disclosed technology. Note that an example of the disclosed technology is described below in embodiments using an education-related content.

First Embodiment

Figure 1:
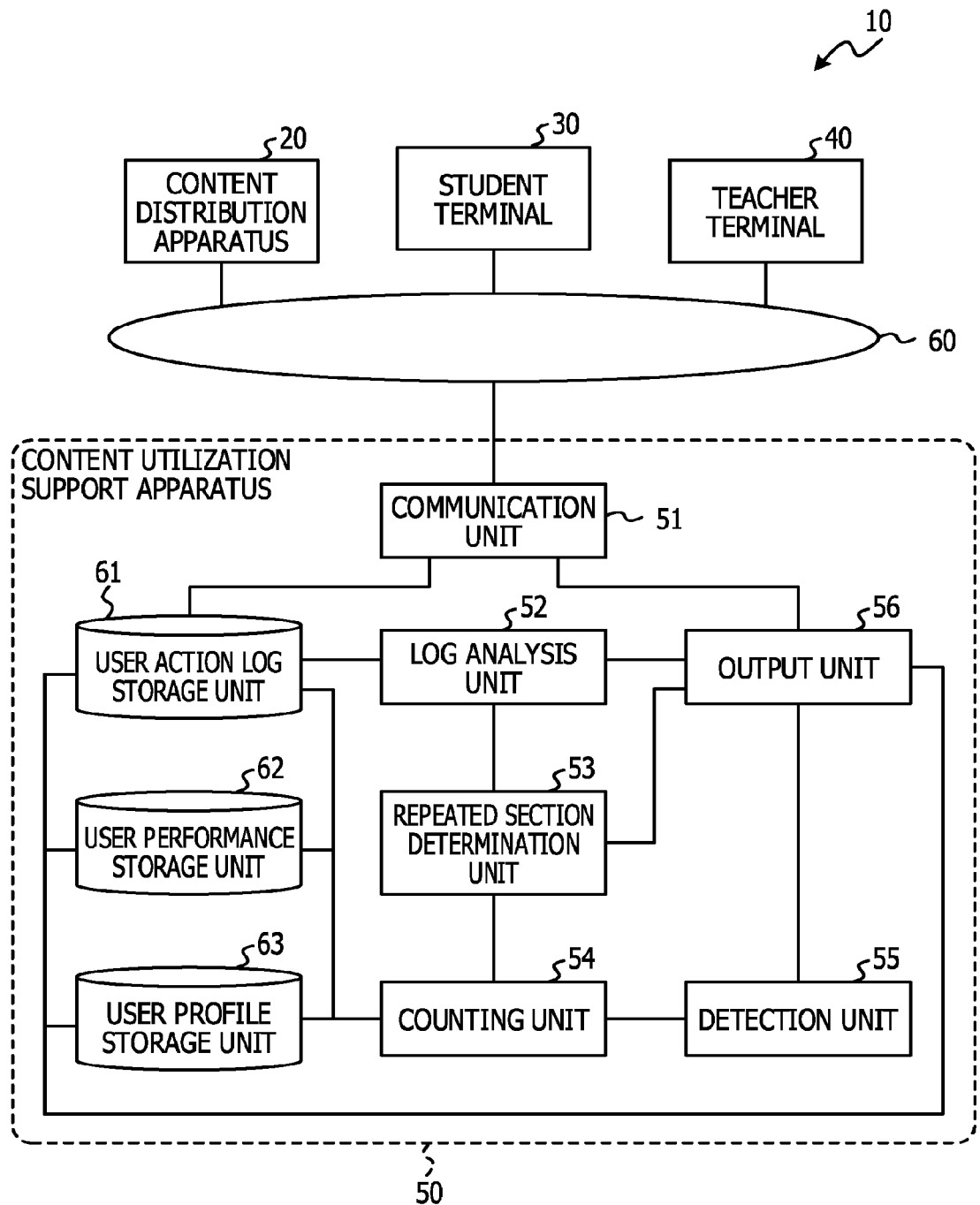
FIG. 1 is a diagram illustrating an example of an educational content utilization support system according to a first embodiment.

FIG. 1 is a diagram illustrating an example of an educational content utilization support system 10 according to this embodiment.

The educational content utilization support system 10 is a system in which, for example, a content distribution apparatus 20, a student terminal 30, a teacher terminal 40, and a content utilization support apparatus 50 are connected to each other through a communication line 60. Here, description is given assuming that the communication line 60 according to this embodiment is Internet connection. However, the type of the communication line 60 is not limited thereto. For example, the communication line 60 may be a dedicated line or an intranet such as an office LAN. Moreover, the communication line 60 may take any form, such as wired, wireless, and combination thereof.

Note that, hereinafter, the "educational content utilization support system 10" is referred to as the "support system 10", and the "content utilization support apparatus 50" is referred to as the "support apparatus 50".

The content distribution apparatus 20 is an apparatus configured to store an education-related content in a storage region, and to distribute the content upon request of the student terminal 30 and the teacher terminal 40.

Here, description is given assuming that the content utilization support apparatus 50 according to this embodiment is an apparatus configured to store and distribute video data on a teacher's lecture, for example, as content. However, an example of the content is not limited thereto. For example, the content may include data that may be audio-outputted or displayed on the student terminal 30 and the teacher terminal 40, such as audio data and text data.

The content is prepared by a teacher, an educational materials production company or the like for each lecture, for example, and is stored in the content distribution apparatus 20. Moreover, there is also a case where a plurality of different contents are included in one lecture. Here, a learning curriculum of a lecture to be attended by students is referred to as a "course".

Note that the content includes examinations for the students to know their understanding of a learning content, for example. Also, a content ID (identification) for uniquely identifying the content is attached to a header of the content, for example, and is used for management of the content in the support system 10.

As described above, the content distribution apparatus 20 stores contents for each course, and anyone registered with the support system 10 beforehand may browse the content of a course registered to attend, from the content distribution apparatus 20. Note that, in the support system 10 according to this embodiment, a course registration fee and cost of browsing the content are free. However, the embodiments are not limited thereto, and such a fee and cost may be paid.

The student terminal 30 is a terminal used by a user registered with the course, i.e., a student who attends the course to replay the content. In order to replay the content using the student terminal 30, a user ID and a password given by the support system 10 during the course registration, for example, are inputted to the student terminal 30 to identify the user. Then, after authentication of the use of the support system 10 using the user ID and the password is normally completed, the content of the course to attend is displayed on the student terminal 30.

Note that, since the disclosed technology is described using the education-related content as an example in this embodiment, the "user" is used as the meaning of the "student".

The student terminal 30 is an Internet-ready information terminal such as a smartphone, a tablet terminal, and a personal computer, for example. There are cases where the user prepares his/her own student terminal and where a provider of the support system 10 lends the student terminal to the user.

Note that the student terminal 30 includes browsing software such as a browser distributed for free, and replays the content of the course registered through the browser.

When the user specifies a content desired to be replayed, the browser of the student terminal 30 acquires screen data for displaying the content, which is described in extensible markup language (XML) or the like and is desired to be replayed by the user, from the content distribution apparatus 20, for example.

The acquired screen data includes a content ID of the content desired to be replayed by the user and information about a storage location in the content distribution apparatus 20. Therefore, the browser of the student terminal 30 acquires the content corresponding to the content ID included in the screen data from the storage location in the content distribution apparatus 20 included in the screen data, and displays the content on the student terminal 30.

The acquired screen data also includes a uniform resource locator (URL) indicating an address of the support apparatus 50 in the communication line 60. Therefore, the browser of the student terminal 30 transmits a support information acquisition request including the content ID of the content desired to be replayed by the user and the user ID to the support apparatus 50, acquires display data on support information supporting the utilization of the content, and displays the data on the student terminal 30. Note that the support information displayed on the student terminal 30 is described in detail later.

Moreover, when the user executes an operation, such as play, stop, fast-forward and rewind, for the content displayed by the browser, the student terminal 30 transmits an action log to the support apparatus 50.

The action log includes, for example, the content ID of the content, the user ID, the type of the operation, the content replay position where the operation is executed, the time and date of the execution of the operation, user setting information during the operation, and the like. Here, the user setting information includes information that may be set by the user for content replay, such as setting of a so-called caption function to display sounds made within the content in letters, for example, and setting of a replay speed of the content.

The teacher terminal 40 is a terminal used by a teacher who gives a lecture of a course to replay a content. As in the case of the student terminal 30, an Internet-ready information terminal is used, such as a smartphone, a tablet terminal and a personal computer, for example. Also, as in the case of the student terminal 30, there are cases where the teacher prepares his/her own teacher terminal and where the provider of the support system 10 lends the teacher terminal to the teacher.

In order to replay the content using the teacher terminal 40, a teacher ID and a password given to the teacher by the support system 10 are inputted to the teacher terminal 40. Then, after authentication of the use of the support system 10 using the teacher ID and the password is normally completed, the content is displayed on the teacher terminal 40.

Note that the teacher terminal 40 includes browsing software such as a browser distributed for free, and replays the content in the content distribution apparatus 20 through the browser.

When the teacher specifies a content desired to be replayed, the browser of the teacher terminal 40 acquires screen data for displaying the content, which is described in XML or the like and is desired to be replayed by the teacher, from the support apparatus 50, for example.

The acquired screen data includes a content ID of the content desired to be replayed by the teacher and information about a storage location in the content distribution apparatus 20. Therefore, the browser of the teacher terminal 40 acquires the content corresponding to the content ID included in the screen data from the storage location in the content distribution apparatus 20 included in the screen data, and displays the content on the teacher terminal 40.

The acquired screen data also includes a URL indicating an address of the support apparatus 50 in the communication line 60. Therefore, the browser of the teacher terminal 40 transmits a support information acquisition request including the content ID of the content desired to be replayed by the user and the teacher ID to the support apparatus 50, acquires display data on support information supporting the utilization of the content, and displays the data on the teacher terminal 40. Note that the support information displayed on the teacher terminal 40 is described in detail later.

In FIG. 1, for ease of description, only one student terminal 30 and one teacher terminal 40 are connected to the communication line 60. However, in reality, a plurality of student terminals 30 and teacher terminals 40 are connected to the communication line 60 according to the number of the users and teachers. Moreover, the number of the content distribution apparatuses 20 is also not limited to one, and more than one content distribution apparatus 20 may be connected to the communication line 60.

The support apparatus 50 includes functional units such as a communication unit 51, a log analysis unit 52, a repeated section determination unit 53, a counting unit 54, a detection unit 55, and an output unit 56. The support apparatus 50 also includes storage units configured to store information, such as a user action log storage unit 61, a user performance storage unit 62, and a user profile storage unit 63.

The communication unit 51 is connected to the communication line 60, and transmits and receives data to be used by the support system 10 to and from the content distribution apparatus 20, the student terminal 30 and the teacher terminal 40. The communication unit 51 is also connected to the output unit 56 and the user action log storage unit 61.

The communication unit 51 receives an action log of the user for the content, which is transmitted by the student terminal 30, and stores the received action log in the user action log storage unit 61.

Also, the communication unit 51 receives the support information acquisition requests from the student terminal 30 and the teacher terminal 40, and notifies the output unit 56 of the received support information acquisition requests. At the same time, the communication unit 51 transmits support information, which is sent from the output unit 56 in response to the notified support information acquisition request, to the terminals as the sources of the support information acquisition requests.

The user action log storage unit 61 is connected to the communication unit 51, the log analysis unit 52, the counting unit 54, and the output unit 56. The user action log storage unit 61 includes an action attribute definition table and an action attribute value table to be described later. The user action log storage unit 61 also includes a content browsing log table recording action logs transmitted from the student terminal 30 through the communication unit 51.

FIG. 2 is a diagram illustrating an example of the content browsing log table. In a content browsing log table 1, the target content column stores the content ID of the action log, the user column stores user IDs of the action logs, the action column stores the types of operations of the action logs, and the position column stores content replay positions where the operations of the action logs are executed. Also, the time and date column in the content browsing log table 1 stores the time and date of the execution of the operations of the action logs.

The data in the first row of the content browsing log table 1 illustrated in FIG. 2 indicates that a replay start operation is performed by the user A at the position of content replay time 00 minutes 00 seconds for the content with the content ID="V0001" at 19 hours 00 minutes 00 seconds on Jan. 20, 2014. Note that the content replay time is an index representing the replay start position of the content by the time from the beginning of the content.

Note that, in the content browsing log table 1 according to this embodiment, as an example, more recent information is disposed in the lower row of the content browsing log table 1.

Meanwhile, the log analysis unit 52 is connected to the repeated section determination unit 53, the output unit 56, and the user action log storage unit 61.

The log analysis unit 52 generates a replay frequency count table by referring to the content browsing log table 1 in the user action log storage unit 61.

Figure 3:
FIG. 3 is a diagram illustrating an example of a replay frequency count table.

FIG. 3 is a diagram illustrating an example of the replay frequency count table. As illustrated in FIG. 3, a replay frequency count table 2 includes target content, section, replay frequency and replaying user, for example.

Referring to the content browsing log table 1 illustrated in FIG. 2, the log analysis unit 52 acquires a content replay section from the value in the position column corresponding to "replay start" in the action column and the value in the position column corresponding to "stop" for each content.

Then, the log analysis unit 52 analyzes which section of the content is replayed by which user and how many times that section is replayed, for each content, from the acquired content replay section. The log analysis unit 52 generates the replay frequency count table 2 by setting the replay section, which is analyzed from the positions of the replay start and stop of the content, in the section column, the replay frequency of the replay section in the replay frequency column, and the user who has replayed the replay section in the replay user column, respectively, for each content.

For example, the data in the first row of the replay frequency count table 2 illustrated in FIG. 3 indicates that the section from 00 minutes 00 seconds to 00 minutes 01 seconds of the content with the content ID="V0001" is replayed four times in total by the users A, B, C, and D. Note that, in the replay user column of the replay frequency count table 2, the number in parentheses after the user ID represents the replay frequency by the user represented by the user ID. For the user ID corresponding to the user with the replay frequency of 1, the notation of "(1)" is omitted.

Meanwhile, the repeated section determination unit 53 is connected to the log analysis unit 52, the counting unit 54, and the output unit 56.

Referring to the replay frequency count table 2 generated by the log analysis unit 52, the repeated section determination unit 53 determines a section to which the user pays attention in the content. To be more specific, assuming that an average replay frequency per user for a certain section is a focus value of that section, for example, the repeated section determination unit 53 determines that, for each content, a section having the focus value larger than a predetermined threshold is the section to which the user pays attention. Note that the section having the focus value larger than the predetermined threshold is referred to as a repeated section.

Figure 4:
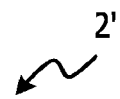
FIG. 4 is a diagram illustrating an example of a replay frequency count table with a focus value added thereto.

FIG. 4 is a diagram illustrating an example of a replay frequency count table 2' obtained by adding a column of the focus value to the replay frequency count table 2 illustrated in FIG. 3.

The repeated section determination unit 53 generates a repeated section table by extracting data on the row having the focus value larger than the predetermined threshold from the replay frequency count table 2' illustrated in FIG. 4.

Figure 5:
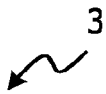
FIG. 5 is a diagram illustrating an example of a repeated section table.

FIG. 5 is a diagram illustrating an example of a repeated section table 3. As illustrated in FIG. 5, the repeated section table 3 includes repeated section No, target content, repeated section, repeatedly replaying user and focus value, for example.

Here, the repeated section No is an identifier for identifying the repeated section. Also, the repeatedly replaying user is a user who has repeatedly replayed the repeated section.

Meanwhile, the counting unit 54 is connected to the repeated section determination unit 53, and the detection unit 55, and is also connected to the user action log storage unit 61, the user performance storage unit 62, and the user profile storage unit 63.

In the support apparatus 50, values or states for each user, corresponding to many different kinds of predetermined information items, are stored in the user action log storage unit 61, the user performance storage unit 62 and the user profile storage unit 63. Note that many different kinds of information items regarding a user are referred to as attributes, and a name of each of the attributes is referred to as an attribute name.

FIG. 6 is a diagram illustrating an example of an action attribute definition table stored in the user action log storage unit 61.

As illustrated in FIG. 6, an action attribute definition table 7 is a table defining attribute names regarding action logs and possible values that may be taken by attributes represented by the attribute names. To be more specific, the action attribute definition table 7 includes attribute names, such as presence or absence of captions and presence or absence of test browsing, and possible values of the respective attributes. Here, the attribute name "presence or absence of captions" is an attribute indicating whether or not captions are displayed during browsing of the current content by the user. On the other hand, the attribute name "presence or absence of test browsing" is an attribute indicating whether or not a test for knowing the understanding of the content is already browsed before the content that is currently being browsed is replayed. Note that the attribute names and the possible values of the attributes, which are defined in the action attribute definition table 7 illustrated in FIG. 6, are merely an example, and are not limited to those illustrated in FIG. 6.

For example, an attribute name "presence or absence of assignment submission from the previous lecture" may be added, and "assignment submitted, no assignment submitted" may be defined as possible values of the attribute name. Also, an attribute name "presence or absence of comment on discussion board" may be added, and "comment made, no comment made" may be defined as possible values of the attribute name. Moreover, considering a registration status of another course, an attribute name "presence or absence of registration for course No. M" may be added, and "registered, not registered" may be defined as possible values of the attribute name. Furthermore, an attribute name "presence or absence of acquisition of certificate of course No. M" may be added, and "certificate acquired, no certificate acquired" may be defined as possible values of the attribute name. Note that "course No." is the number uniquely assigned to each course to identify the course, and "M" represents the number assigned.

FIG. 7 is a diagram illustrating an example of an action attribute value table 7' corresponding to the action attribute definition table 7.

As illustrated in FIG. 7, the action attribute value table 7' includes the user IDs of the users registered with the support system 10, the attribute names defined in the action attribute definition table 7 and the attribute values for every user, for example. The action attribute value table 7' is a table in which the attribute names defined in the action attribute definition table 7 are associated with the attribute values for every user.

FIG. 8 is a diagram illustrating an example of a performance attribute definition table stored in the user performance storage unit 62.

As illustrated in FIG. 8, the performance attribute definition table 8 is a table defining attribute names regarding user performance and possible values of attributes represented by the attribute names. To be more specific, the performance attribute definition table 8 includes attribute names, such as the score of the last assignment submitted within the course taken by the user and the average final performance of the courses that have been taken by the user, and possible values of the attributes, for example.

Note that the attribute names and the possible values of the attributes, which are defined in the performance attribute definition table 8 illustrated in FIG. 8, are merely an example, and are not limited to those illustrated in FIG. 8. For example, each course may be categorized into subjects, such as mathematics and physics, and average performance of each subject may be included in the performance attribute definition table 8. Alternatively, each course may be categorized into an arts course and a science course, and average performance in the arts course and the science course may be included in the performance attribute definition table 8.

Figure 9:
FIG. 9 is a diagram illustrating an example of a performance attribute value table.

FIG. 9 is a diagram illustrating an example of a performance attribute value table corresponding to the performance attribute definition table 8.

As illustrated in FIG. 9, the performance attribute value table 8' includes the user IDs of the users registered with the support system 10, the attribute names defined in the action attribute definition table 8 and the attribute values for every user, for example. The action attribute value table 8' is a table in which the attribute names defined in the action attribute definition table 8 are associated with the attribute values for every user.

FIG. 10 is a diagram illustrating an example of a user profile attribute definition table stored in the user profile storage unit 63.

As illustrated in FIG. 10, the user profile attribute definition table 9 is a table defining attribute names regarding information to be inputted as profile information indicating characteristics of a user when the user registers with the support system 10, and possible values of attributes represented by the attribute names. To be more specific, the user profile attribute definition table 9 includes attribute names, such as the gender and age of the user, and possible values of the attributes, for example. Note that the attribute names and the possible values of the attributes, which are defined in the user profile attribute definition table 9 illustrated in FIG. 10, are merely an example, and are not limited to those illustrated in FIG. 10.

FIG. 11 is a diagram illustrating an example of a user profile attribute value table corresponding to the user profile attribute definition table 9.

As illustrated in FIG. 11, the user profile attribute value table 9' includes the user IDs of the users registered with the support system 10, the attribute names defined in the user profile attribute definition table 9 and the attribute values for every user, for example. The user profile attribute value table 9' is a table in which the attribute names defined in the user profile attribute definition table 9 are associated with the attribute values for every user.

Note that, as illustrated in FIGS. 6, 8, and 10, a number for uniquely identifying each attribute name is attached to the attribute name, and is managed by the support apparatus 50.

Referring to the replay frequency count table 2' illustrated in FIG. 4 and the repeated section table 3 illustrated in FIG. 5, the counting unit 54 classifies the users who have replayed the content including the repeated section at least once or more into repeatedly replaying users and non-repeatedly replaying users, for each repeated section. Note that the non-repeatedly replaying users are those other than the repeatedly replaying users.

Then, the counting unit 54 figures out a distribution of attribute values of the repeatedly replaying users and a distribution of attribute values of the non-repeatedly replaying users, for each attribute name and each repeated section. In this embodiment, a distribution of attribute values of a certain attribute name represents the number of users having an attribute value corresponding to any of the possible values of the attribute specified by the attribute name.

To be more specific, taking the presence or absence of captions as an example, the counting unit 54 counts the number of users replaying the content with captions and the number of users replaying the content without captions, among the repeatedly replaying users, for each repeated section. Likewise, the counting unit 54 counts the number of users replaying the content with captions and the number of users replaying the content without captions, among the non-repeatedly replaying users, for each repeated section.

The detection unit 55 is connected to the counting unit 54, and the output unit 56.

For each repeated section of each content, the detection unit 55 compares the distribution of the attribute values of the repeatedly replaying users with the distribution of the attribute values of the non-repeatedly replaying users, for each attribute name, which are counted by the counting unit 54. Then, the detection unit 55 detects an attribute having a significant difference between the distribution of the attribute values of the repeatedly replaying users and the distribution of the attribute values of the non-repeatedly replaying users, and associates the detected attribute with the repeated section of the content. Here, the situation that there is a significant difference means that a probability of accidental occurrence of a biased distribution of the attribute values of the repeatedly replaying users with respect to the distribution of the attribute values of the non-repeatedly replaying users is less than a significance level, in other words, it is unlikely that bias has accidentally occurred.

Note that the attribute having a significant difference between the distribution of the attribute values of the repeatedly replaying users and the distribution of the attribute values of the non-repeatedly replaying users is referred to as an attribute characteristic of the repeatedly replaying users.

Meanwhile, the output unit 56 is connected to the communication unit 51, the log analysis unit 52, the repeated section determination unit 53, and the detection unit 55. The output unit 56 is also connected to the user action log storage unit 61, the user performance storage unit 62 and the user profile storage unit 63.

The output unit 56 converts correspondence information into a data format that may be displayed on the browser of the student terminal 30 and the teacher terminal 40, the correspondence information including a repeated section in the content associated by the detection unit 55 and the attribute characteristic of the repeatedly replaying users within the repeated section.

Also, referring to the replay frequency count table 2' illustrated in FIG. 4, the output unit 56 generates a graph representing a replay frequency at a content replay position for each content. Then, the output unit 56 converts the generated graph into the data format that may be displayed on the browser of the student terminal 30 and the teacher terminal 40.

Moreover, for each repeated section detected by the detection unit 55, the output unit 56 converts the distributions of the attribute values of the repeatedly replaying users and the non-repeatedly replaying users into graphs, with respect to the attribute characteristic of the corresponding repeatedly replaying users. Then, the output unit 56 converts the distributions of the attribute values, which are converted into graphs, into the data format that may be displayed on the browser of the student terminal 30 and the teacher terminal 40.

Furthermore, when display data of support information supporting the utilization of contents is requested by support information acquisition requests from the student terminal 30 and the teacher terminal 40, the output unit 56 transmits the display data of the support information to the teacher terminal 40 through the communication unit 51.

Figure 12:
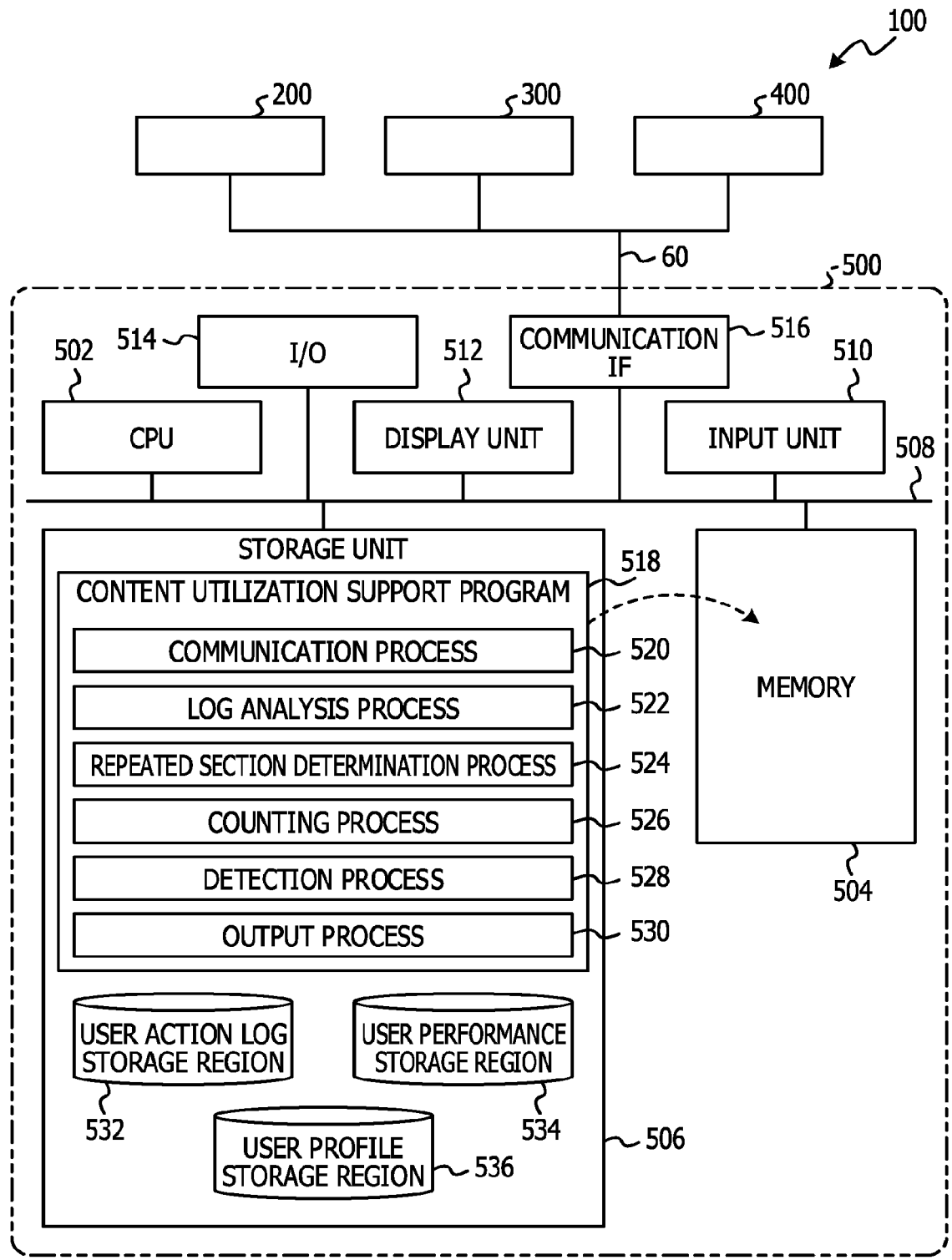
FIG. 12 is a diagram illustrating an example of a computer system that realizes the educational content utilization support system according to the first embodiment.

Next, FIG. 12 illustrates a computer system 100 as an example where the content distribution apparatus 20, the student terminal 30, the teacher terminal 40, and the support apparatus 50, which are included in the support system 10, may be realized using computers.

The computer system 100 as the support system 10 includes a computer 200 as the content distribution apparatus 20, a computer 300 as the student terminal 30, a computer 400 as the teacher terminal 40 and a computer 500 as the support apparatus 50.

The computer 500 includes a CPU 502, a memory 504, and a non-volatile storage unit 506. The CPU 502, the memory 504, and the non-volatile storage unit 506 are connected to each other through a bus 508. The computer 500 also includes an input unit 510, such as a keyboard and a mouse, and a display unit 512 such as a display. The input unit 510 and the display unit 512 are connected to the bus 508. Moreover, the computer 500 includes an I/O 514 for reading from and writing into a recording medium. The I/O 514 is connected to the bus 508. Furthermore, the computer 500 includes a communication IF (Interface) 516 including an interface for connecting to the communication line 60. The communication IF 516 is also connected to the bus 508. Note that the storage unit 506 may be realized by an HDD (Hard Disk Drive), a flash memory or the like. Here, the input unit 510, the display unit 512, and the I/O 514 are not necessarily used in the computer 500.

The storage unit 506 stores a content utilization support program 518 for the computer 500 to function as the support apparatus 50 illustrated in FIG. 1. The content utilization support program 518 stored in the storage unit 506 includes a communication process 520, a log analysis process 522, a repeated section determination process 524, a counting process 526, a detection process 528, and an output process 530.

The CPU 502 reads the content utilization support program 518 from the storage unit 506, develops the program in the memory 504, and executes each of the processes included in the content utilization support program 518.

The CPU 502 reads the content utilization support program 518 from the storage unit 506, develops the program in the memory 504, and executes the content utilization support program 518, thereby allowing the computer 500 to operate as the support apparatus 50 illustrated in FIG. 1.

Also, the CPU 502 executes the communication process 520, thereby allowing the computer 500 to operate as the communication unit 51 illustrated in FIG. 1. Moreover, the CPU 502 executes the log analysis process 522, thereby allowing the computer 500 to operate as the log analysis unit 52 illustrated in FIG. 1. Furthermore, the CPU 502 executes the repeated section determination process 524, thereby allowing the computer 500 to operate as the repeated section determination unit 53 illustrated in FIG. 1. Also, the CPU 502 executes the counting process 526, thereby allowing the computer 500 to operate as the counting unit 54 illustrated in FIG. 1. Moreover, the CPU 502 executes the detection process 528, thereby allowing the computer 500 to operate as the detection unit 55 illustrated in FIG. 1. Furthermore, the CPU 502 executes the output process 530, thereby allowing the computer 500 to operate as the output unit 56 illustrated in FIG. 1.

Meanwhile, the CPU 502 develops an action log included in a user action log storage region 532 and an attribute name and attributes of a user obtained from the action log in the memory 504, thereby allowing the computer 500 to operate as the user action log storage unit 61. Also, the CPU 502 develops performance information of each user included in a user performance storage region 534 and an attribute name and attributes related to user performance in the memory 504, thereby allowing the computer 500 to operate as the user performance storage unit 62. Moreover, the CPU 502 develops personal information of each user included in a user profile storage region 536, as a user profile, in the memory 504. At the same time, the CPU 502 develops an attribute name and attributes related to the user profile in the memory 504. Thus, the computer 500 operates as the user profile storage unit 63.

Note that the support apparatus 50 may also be realized using a semiconductor integrated circuit, more specifically, an ASIC (Application Specific Integrated Circuit) or the like, for example.

Figure 13:
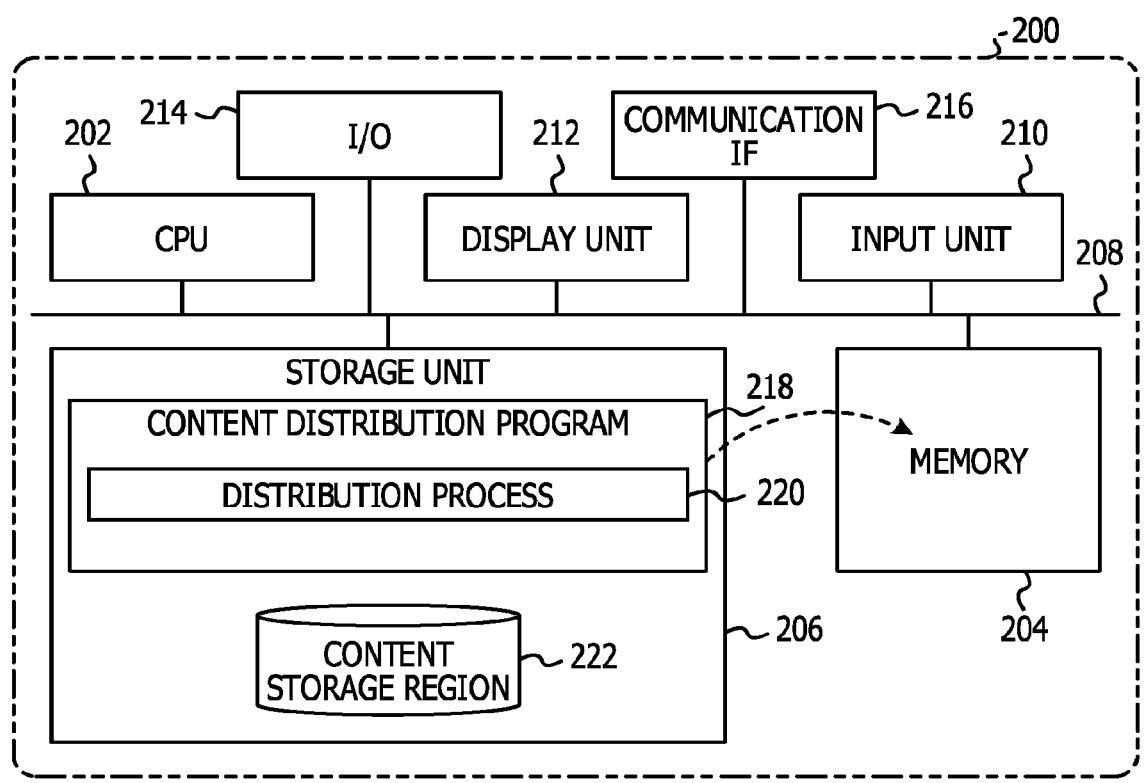
FIG. 13 is a diagram illustrating an example of a computer that functions as a content distribution apparatus.

Next, FIG. 13 illustrates the computer 200 as the content distribution apparatus 20.

The computer 200 includes a CPU 202, a memory 204, and a non-volatile storage unit 206. The CPU 202, the memory 204, and the non-volatile storage unit 206 are connected to each other through a bus 208. The computer 200 also includes an input unit 210, such as a keyboard and a mouse, and a display unit 212 such as a display. The input unit 210 and the display unit 212 are connected to the bus 208. Moreover, the computer 200 includes an I/O 214 for reading from and writing into a recording medium. The I/O 214 is connected to the bus 208. Furthermore, the computer 200 includes a communication IF 216 including an interface for connecting to the communication line 60. The communication IF 216 is also connected to the bus 208. Note that the storage unit 206 may be realized by an HDD, a flash memory or the like. Here, the input unit 210, the display unit 212, and the I/O 214 are not necessarily used in the computer 200.

The storage unit 206 stores a content distribution program 218 for the computer 200 to function as the content distribution apparatus 20 illustrated in FIG. 1. The content distribution program 218 stored in the storage unit 206 includes a distribution process 220, for example.

The CPU 202 reads the content distribution program 218 from the storage unit 206, develops the program in the memory 204, and executes the content distribution program 218, thereby allowing the computer 200 to operate as the content distribution apparatus 20 illustrated in FIG. 1.

Moreover, the CPU 202 develops content data included in a content storage region 222 into the memory 204 as a content. Then, the distribution process 220 distributes the content developed in the memory 204 to the student terminal 30 and the teacher terminal 40.

Figure 14:
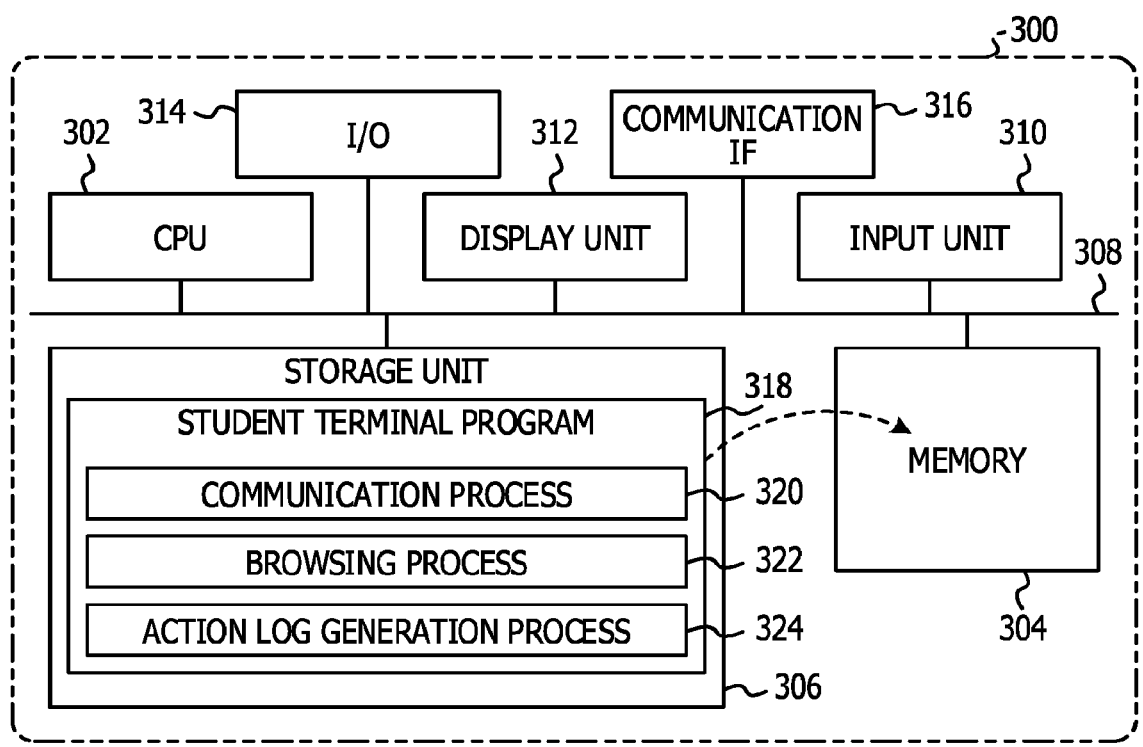
FIG. 14 is a diagram illustrating an example of a computer that functions as a student terminal.

Next, FIG. 14 illustrates the computer 300 as the student terminal 30.

The computer 300 includes a CPU 302, a memory 304, and a non-volatile storage unit 306. The CPU 302, the memory 304, and the non-volatile storage unit 306 are connected to each other through a bus 308. The computer 300 also includes an input unit 310, such as a keyboard and a mouse, and a display unit 312 such as a display. The input unit 310 and the display unit 312 are connected to the bus 308. Moreover, the computer 300 includes an I/O 314 for reading from and writing into a recording medium. The I/O 314 is connected to the bus 308. Furthermore, the computer 300 includes a communication IF 316 including an interface for connecting to the communication line 60. The communication IF 316 is also connected to the bus 308. Note that the storage unit 306 may be realized by an HDD, a flash memory or the like. Here, the input unit 310, the display unit 312, and the I/O 314 are not necessarily used in the computer 300.

The storage unit 306 stores a student terminal program 318 for the computer 300 to function as the student terminal 30 illustrated in FIG. 1. The student terminal program 318 stored in the storage unit 306 includes a communication process 320, a browsing process 322, and an action log generation process 324, for example.

The CPU 302 reads the student terminal program 318 from the storage unit 306, develops the program in the memory 304, and executes the student terminal program 318, thereby allowing the computer 300 to operate as the student terminal 30 illustrated in FIG. 1.

Then, the communication process 320 transmits and receives various data to and from the respective computers connected to the communication line 60. Also, the browsing process 322 displays the content received from the computer 200 and the support information received from the computer 500, for example, on the display unit 312. Moreover, the action log generation process 324 collects details of content operation by the user, user setting information and the like to generate an action log.

Figure 15:
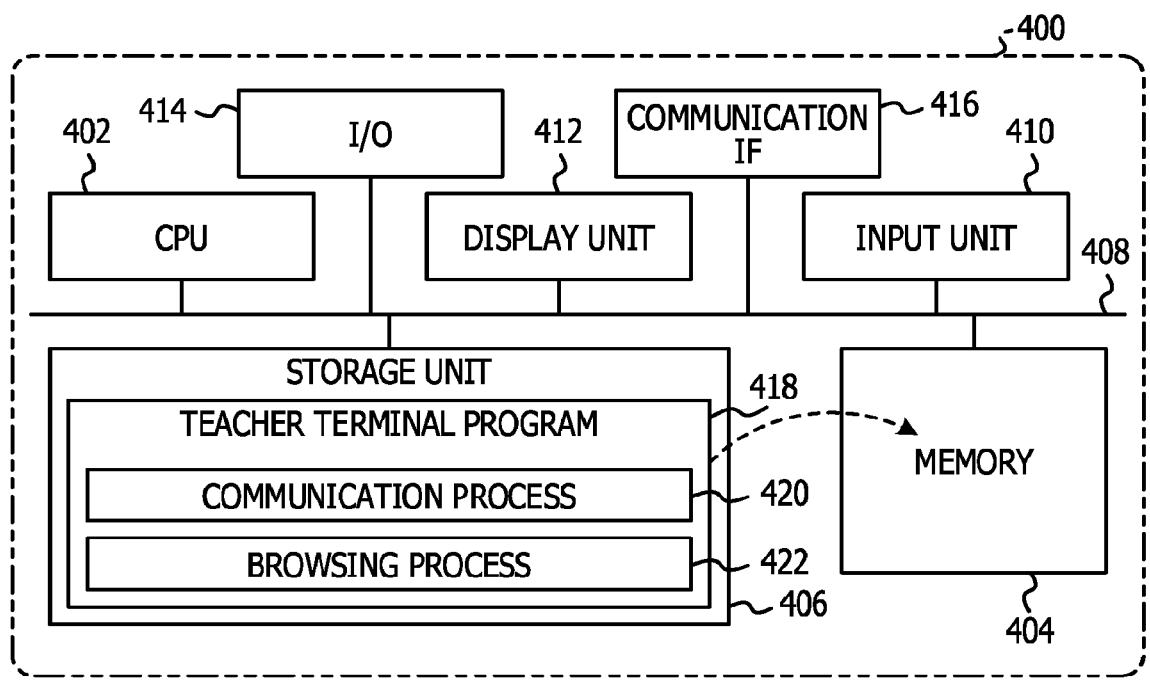
FIG. 15 is a diagram illustrating an example of a computer that functions as a teacher terminal.

Next, FIG. 15 illustrates the computer 400 as the teacher terminal 40.

The computer 400 includes a CPU 402, a memory 404, and a non-volatile storage unit 406. The CPU 402, the memory 404, and the non-volatile storage unit 406 are connected to each other through a bus 408. The computer 400 also includes an input unit 410, such as a keyboard and a mouse, and a display unit 412 such as a display. The input unit 410 and the display unit 412 are connected to the bus 408. Moreover, the computer 400 includes an I/O 414 for reading from and writing into a recording medium. The I/O 414 is connected to the bus 408. Furthermore, the computer 400 includes a communication IF 416 including an interface for connecting to the communication line 60. The communication IF 416 is also connected to the bus 408. Note that the storage unit 406 may be realized by an HDD, a flash memory or the like. Here, the input unit 410, the display unit 412, and the I/O 414 are not necessarily used in the computer 400.

The storage unit 406 stores a teacher terminal program 418 for the computer 400 to function as the teacher terminal 40 illustrated in FIG. 1. The teacher terminal program 418 stored in the storage unit 406 includes a communication process 420 and a browsing process 422, for example.

The CPU 402 reads the teacher terminal program 418 from the storage unit 406, develops the program in the memory 404, and executes the teacher terminal program 418, thereby allowing the computer 400 to operate as the teacher terminal 40 illustrated in FIG. 1.

Then, the communication process 420 transmits and receives various data to and from the respective computers connected to the communication line 60. Also, the browsing process 422 displays the content received from the computer 200 and the support information received from the computer 500, for example, on the display unit 412.

Next, description is given of operations of the support apparatus 50 according to this embodiment. The support apparatus 50 according to this embodiment performs support information generation processing after the support apparatus 50 is turned on, for example, and executes the support information generation processing with every lapse of a predetermined time. Note that the execution timing of the support information generation processing is not limited to the above. Needless to say, the support apparatus 50 may execute the support information generation processing at a timing different from that exemplified above, such as when the support apparatus 50 receives the action log from the student terminal 30, for example.

Figure 16:
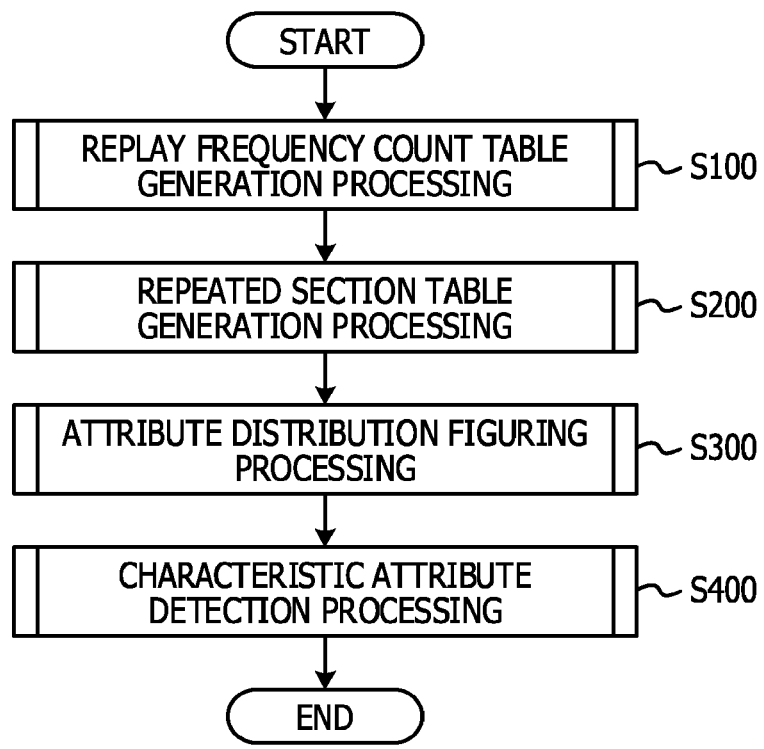
FIG. 16 is a flowchart illustrating an example of a support information generation processing flow according to the first embodiment.

FIG. 16 is a flowchart illustrating an example of a support information generation processing flow according to this embodiment. Here, for ease of description, it is assumed that only one content ID: "V0001" is included in the target content column of the content browsing log table 1 according to this embodiment. Note that, needless to say, more than one content ID may be included in the target content column of the content browsing log table 1 illustrated in FIG. 2.

First, in Step S100, the log analysis unit 52 generates the replay frequency count table 2 illustrated in FIG. 3 by referring to the content browsing log table 1 stored in the user action log storage unit 61. Then, the log analysis unit 52 stores the generated replay frequency count table 2 in a predetermined region of the memory 504.

In Step S200, the repeated section determination unit 53 generates the repeated section table 3 by referring to the replay frequency count table 2 generated by the processing in Step S100, and stores the generated repeated section table 3 in a predetermined region of the memory 504.

In Step S300, the counting unit 54 classifies the users who have replayed the repeated section into repeatedly replaying users and non-repeatedly replaying users, for each repeated section of the content, by referring to the repeated section table 3 generated by the processing in Step S200. Then, the counting unit 54 figures out a distribution of attribute values of the repeatedly replaying users and a distribution of attribute values of the non-repeatedly replaying users, for each attribute name and each repeated section.

In Step S400, for each repeated section of the content, the detection unit 55 compares the distribution of the attribute values of the repeatedly replaying users with the distribution of the attribute values of the non-repeatedly replaying users, for each of the attribute names counted by the processing in Step S300. Then, the detection unit 55 detects an attribute characteristic of the repeatedly replaying users, for each repeated section of the content, and stores the repeated section of the content and the detected attribute characteristic of the repeatedly replaying users in a predetermined region of the memory 504 while associating the both with each other.

The respective processing in Steps S100 to S400 are described in detail below.

Figure 17:
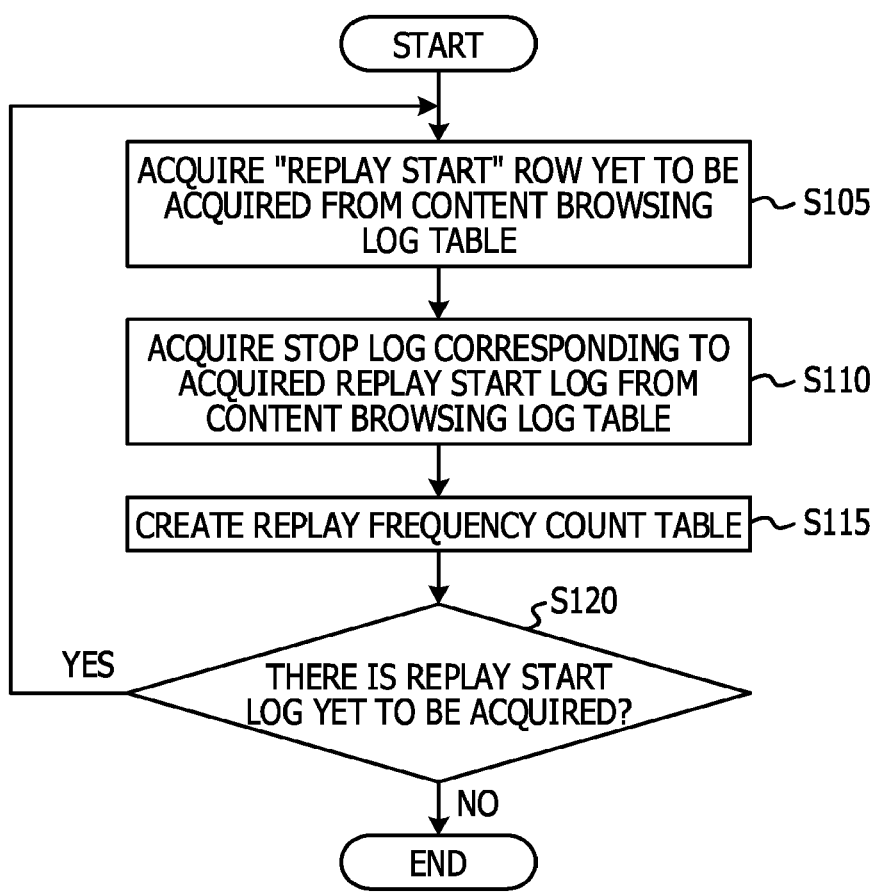
FIG. 17 is a flowchart illustrating an example of a replay frequency count table generation processing flow.

FIG. 17 is a flowchart illustrating an example of a flow of the replay frequency count table generation processing in Step S100 illustrated in FIG. 16.

In Step S105, the log analysis unit 52 acquires data on the row having "replay start" recorded in the action column, by referring to the data in the respective rows sequentially from the first row of the content browsing log table 1 illustrated in FIG. 2, for example. Note that the row corresponding to the data acquired by the processing in Step S105 is referred to as the replay start row.

In Step S110, the log analysis unit 52 sequentially refers to the content browsing log table 1 from the replay start row acquired by the processing in Step S105 toward the lower rows. Then, the log analysis unit 52 acquires data on the row including the same content and user as those included in the replay start row and having "stop" in the action column. Note that the row corresponding to the data acquired by the processing in Step S110 is referred to as the replay stop row.

In the content browsing log table 1, a stop log is recorded also when a fast-forward operation or a rewind operation is performed without stopping replay of the content. In the content browsing log table 1, on the other hand, a replay log is recorded also when fast-forward or rewind is finished and replay is resumed without explicitly stopping the fast-forward or rewind of the content, such as a skip operation. Therefore, the log analysis unit 52 may figure out a position where the content is replayed by the user and a position where the replay of the content is stopped by the user from the content browsing log table 1.

In Step S115, the log analysis unit 52 calculates a content replay section from the time in the position column of the replay start row acquired by the processing in Step S105 and the time in the position column of the replay stop row acquired by the processing in Step S110.

The replay frequency count table 2 illustrated in FIG. 3 is generated as a table, in its initial state, in which the target content is divided into sections of 1 second, for example, and data for one row is prepared for each section. In the initial state of the replay frequency count table 2, the replay frequency is set to "0" in each row, and no replaying user is set.

Therefore, in the replay frequency count table 2, the log analysis unit 52 increases the replay frequency by 1 in the row indicating the section that coincides with the content replay section, and sets the user ID of the user who has replayed the content in the replaying user column in the row indicating the section that coincides with the replay section.

In Step S120, the log analysis unit 52 determines whether or not there is row data yet to be acquired among the data on the rows having "replay start" recorded in the action column of the content browsing log table 1 illustrated in FIG. 2. When the determination result is positive, the processing moves to Step S105 to repeat the processing of Steps S105 to S120 on the replay start rows yet to be acquired. On the other hand, when the determination result is negative, the processing illustrated in FIG. 17 is terminated.

Thus, the log analysis unit 52 generates the replay frequency count table 2 illustrated in FIG. 3 by the replay frequency count table generation processing illustrated in FIG. 17.

Figure 18:
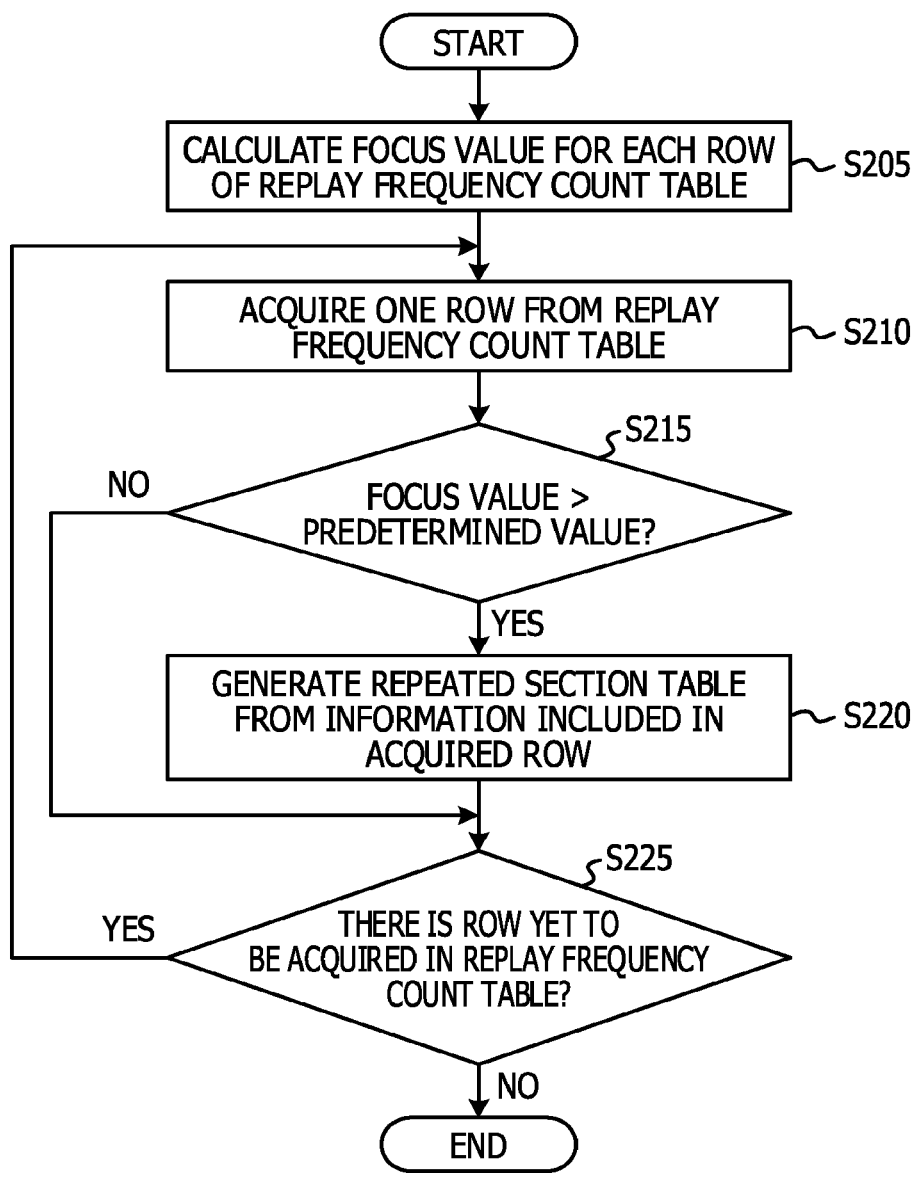
FIG. 18 is a flowchart illustrating an example of a repeated section table generation processing flow.

FIG. 18 is a flowchart illustrating an example of a flow of the repeated section table generation processing in Step S200 illustrated in FIG. 16.

First, in Step S205, the repeated section determination unit 53 calculates a focus value for each data in each row of the replay frequency count table 2 illustrated in FIG. 3 generated in Step S100. As already described, the focus value is the average replay frequency per user who has replayed the content section shown in the section column of the replay frequency count table 2, for example. Then, the repeated section determination unit 53 adds the calculated focus value to the replay frequency count table 2' illustrated in FIG. 4 while associating the focus value with the row data used for the calculation of the focus value.

In Step S210, the repeated section determination unit 53 selects data for one row from the replay frequency count table 2', for example, and acquires data included in the selected row.

Then, in Step S215, the repeated section determination unit 53 compares the focus value included in the row data acquired by the processing in Step S210 with a predetermined threshold, and determines whether or not the focus value is larger than the predetermined threshold. When the determination result is positive, the processing moves to Step S220. On the other hand, when the determination result is negative, the processing of Step S220 is omitted and the processing moves to Step S225.

Here, the predetermined threshold is a boundary value that may regard the content section associated with the focus value as a section to which the user pays attention. Note that the predetermined threshold is predetermined by an administrator or the like of the support apparatus 50, for example, and is previously developed in a predetermined region of the memory 504 by the CPU 502.

Generally, the section to which the user pays attention is repeatedly replayed by the user. More specifically, a larger focus value may indicate that the user pays attention to the content section associated with the focus value. Therefore, the repeated section determination unit 53 determines that the content section having the focus value larger than the predetermined threshold is the section to which the user pays attention.

In the case of an education-related content, the repeated section is a section repeatedly replayed by the user, and thus may be considered to be a difficult section for the user to understand, for example.

In Step S220, the repeated section determination unit 53 generates the repeated section table 3 illustrated in FIG. 5 by using the data included in the row of the replay frequency count table 2' illustrated in FIG. 4 acquired by the processing of Step S210. Note that, when generating the repeated section table 3 from the replay frequency count table 2', the repeated section determination unit 53 puts together consecutive sections replayed by the same repeatedly replaying user as one repeated section.

More specifically, the repeated section table 3 is a table representing a section of the content attracting user's attention and also representing the user who has repeatedly replayed the section attracting attention.

In Step S225, the repeated section determination unit 53 determines whether or not there is row data yet to be acquired in the replay frequency count table 2'. When the determination result is positive, the processing moves to Step S210 to repeat the processing of Steps S210 to S225 on the row data yet to be acquired. On the other hand, when the determination result is negative, the processing illustrated in FIG. 18 is terminated.

Note that, in the processing of Step S205, the average replay frequency per user of the content section shown in the section column of the replay frequency count table 2 is used as the focus value, as an example. However, the focus value is not limited to the average replay frequency. As for the focus value, for example, any value such as the total replay frequency or replay frequency per hour may be used as long as the value represents the replay frequency of the user for the content. Moreover, the calculated focus value may be further corrected.

In the case of an education-related content, there may be a user who stops replaying the content in the middle of a lecture for a reason that he/she may not keep up with the lecture or the like, for example. Thus, the content replay frequency tends to decrease toward the latter section of the content. Therefore, for the calculated focus value, for example, correction may be executed, such as division using an attenuation function that reduces the value with time, such that the possible value is 1 or less. In this case, the repeated section table 3 illustrated in FIG. 5 may include the content section that is not determined to be the repeated section by the repeated section determination unit 53 since the focus value is apparently small even though the user actually pays attention to the content. In other words, the repeated section determination unit 53 may generate the repeated section table 3 corresponding to the situation of the content replay by the user.

Moreover, when a course includes one or more contents, the number of users who replay the content in the latter part of the course is considered to decrease, again, compared with the content in the early part of the course, and is considered to decrease more and more toward the end of the course. Thus, an attenuation function regarding the order of contents during the course may be applied.

The repeated section determination unit 53 thus generates the repeated section table 3 illustrated in FIG. 5 by the repeated section table generation processing illustrated in FIG. 18.

Figure 19:
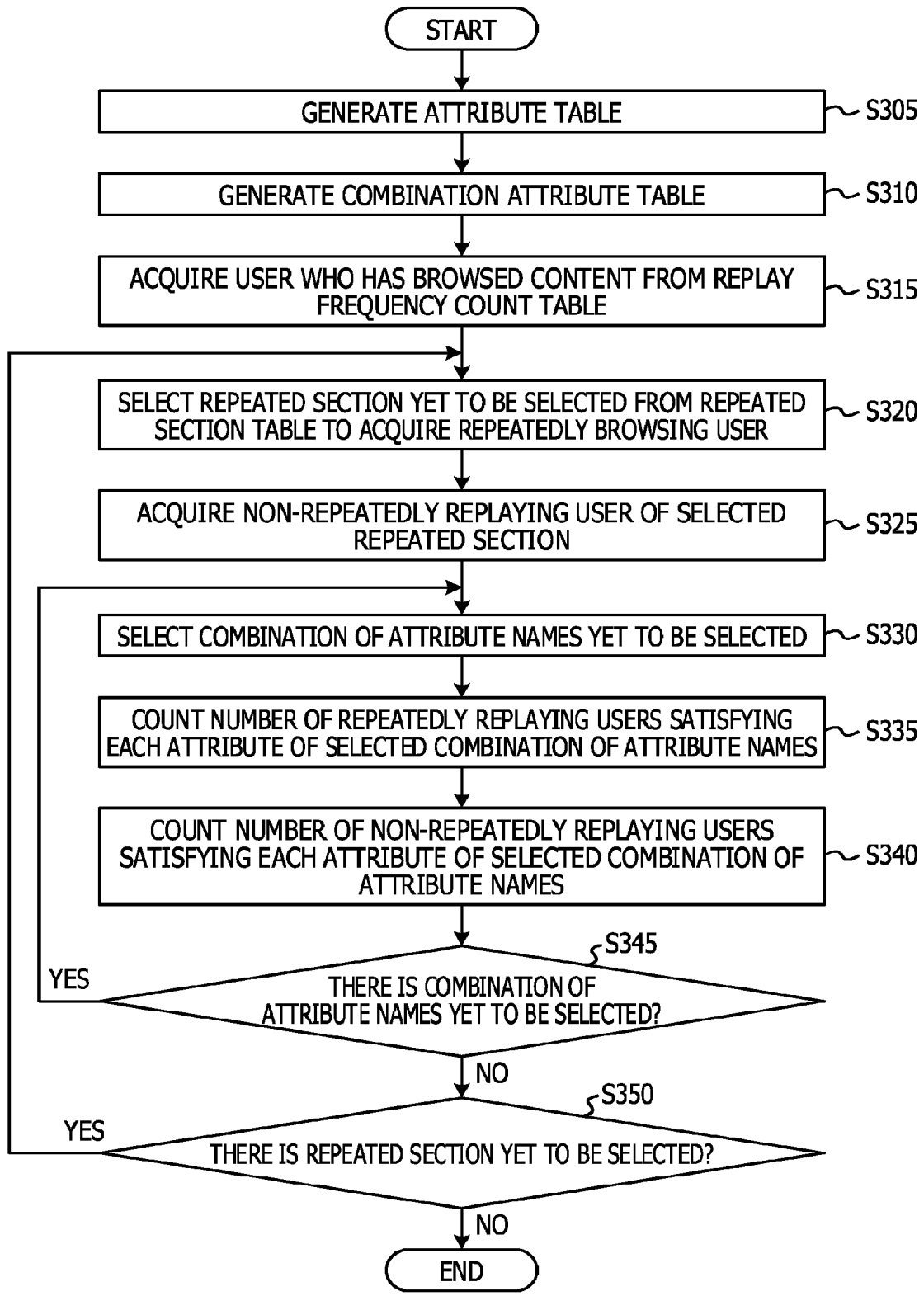
FIG. 19 is a flowchart illustrating an example of an attribute distribution figuring processing flow.

FIG. 19 is a flowchart illustrating an example of a flow of the attribute distribution figuring processing in Step S300 illustrated in FIG. 16.

First, in Step S305, the counting unit 54 reads the action attribute definition table 7 from the user action log storage unit 61, the performance attribute definition table 8 from the user performance storage unit 62 and the user profile attribute definition table 9 from the user profile storage unit 63. Then, the counting unit 54 generates an attribute table by acquiring all the possible values of the attribute names and attributes defined by the support system 10.

As illustrated in FIG. 20, the attribute table 4 is a table including a collection of the attribute names defined in the action attribute definition table 7, the performance attribute definition table 8, and the user profile attribute definition table 9, and the possible values of the attributes.

In Step S310, the counting unit 54 generates a combination attribute table including all the attribute names combined by referring to the attribute table 4 generated by the processing in Step S305.

FIG. 21 is a diagram illustrating an example of a combination attribute table 5. The combination attribute table 5 includes identifiers indicating combination patterns of the attribute names and combination patterns of the possible values of the attributes.

For example, in the example of the combination attribute table 5 illustrated in FIG. 21, "No. 1×No. 2" in the attribute name combination column represents a combination of the presence or absence of captions with the attribute name identifier of No. 1 and the presence or absence of test browsing with the attribute name identifier of No. 2. Therefore, the possible values of the attributes represented by "No. 1×No. 2" are combinations of the possible values of the attributes of the presence or absence of captions and the possible values of the attributes of the presence or absence of test browsing. More specifically, "with captions×with test browsing", "with captions×without test browsing", "without captions×with test browsing" and "without captions×without test browsing" are four possible values of the attributes when the presence or absence of captions and the presence or absence of test browsing are combined.

In Step S315, the counting unit 54 acquires all the users who have replayed a specific target content, for example, the content represented by the content ID "V0001" by referring to the replay frequency count table 2' illustrated in FIG. 4. To be more specific, the counting unit 54 may acquire all the users who have replayed the content represented by the content ID "V0001" by referring to the replaying user column in the respective rows having "V0001" in the target content column of the replay frequency count table 2'.

In Step S320, the counting unit 54 selects one row data yet to be selected from the repeated section table 3 illustrated in FIG. 5, which is generated by the repeated section determination unit 53 performing the processing of Step S200 in FIG. 16. Then, the counting unit 54 acquires repeatedly replaying users who have repeatedly replayed a repeated section included in the selected row.

In Step S325, the counting unit 54 acquires the users other than the repeatedly replaying users acquired by the processing in Step S320, among all the users who have replayed the specific target content acquired by the processing in Step S315, as non-repeatedly replaying users.

In Step S330, the counting unit 54 selects one row data yet to be selected from the combination attribute table 5 illustrated in FIG. 21, which is generated by the processing in Step S310.

In Step S335, the counting unit 54 counts the number of users matching the possible values of the attributes, among the repeatedly replaying users acquired by the processing in Step S320, for each of the possible values of the attributes included in the row of the combination attribute table 5, which is selected in Step S330.

For example, when the row in which the combination of the attribute names is represented by No. 1 in Step S310 is selected, the counting unit 54 counts the number of users who have browsed with captions among the repeatedly replaying users who have browsed the repeated section of the content selected in Step S320. The counting unit 54 also counts the number of users who have browsed without captions among the repeatedly replaying users who have browsed the repeated section of the content selected in Step S320.

Meanwhile, description is given of the case where the row in which the combination of the attribute names is represented by No. 1×No. 2 in Step S310 is selected, for example. In this case, the counting unit 54 counts the number of users who have browsed with captions and already browsed a test of the content, among the repeatedly replaying users who have browsed the repeated section of the content selected in Step S320. Also, the counting unit 54 counts the number of users who have browsed with captions and not yet browsed the test of the content, among the repeatedly replaying users who have browsed the repeated section of the content selected in Step S320. Moreover, the counting unit 54 counts the number of users who have browsed without captions and already browsed the test of the content, among the repeatedly replaying users who have browsed the repeated section of the content selected in Step S320. Furthermore, the counting unit 54 counts the number of users who have browsed without captions and not yet browsed the test of the content, among the repeatedly replaying users who have browsed the repeated section of the content selected in Step S320.

Note that the counting unit 54 may acquire the attributes of the repeatedly replaying users by referring to the attribute values of each attribute name for each user included in the action attribute value table 7' illustrated in FIG. 7, the performance attribute value table 8' illustrated in FIG. 9 and the user profile attribute value table 9' illustrated in FIG. 11. Therefore, the counting unit 54 may count the number of the repeatedly replaying users matching the possible values of the attributes in the combination of the attribute names.

In Step S340, the counting unit 54 counts the number of users matching the possible values of the attributes, among the non-repeatedly replaying users acquired by the processing in Step S325, for each of the possible values of the attributes included in the row of the combination attribute table 5, which is selected in Step S330.

Note that, as in the case of Step S335, the counting unit 54 may acquire the attributes of the non-repeatedly replaying users by referring to the attribute values of each attribute name for each user included in the action attribute value table 7', the performance attribute value table 8' and the user profile attribute value table 9'. Therefore, the counting unit 54 may count the number of the non-repeatedly replaying users matching the possible values of the attributes in the combination of the attribute names.

Then, the counting unit 54 generates an attribute count table in which the repeated section, the combination of attribute names, the possible values of the attributes in the combination of attribute names, and the number of users matching the possible values of the attributes among the repeatedly replaying users and non-repeatedly replaying users.

FIG. 22 is a diagram illustrating an example of an attribute count table 6. As illustrated in FIG. 22, the attribute count table 6 includes the attribute count No for identifying a data unit included in the attribute count table 6, the number representing the repeated section selected by the processing in Step S320, and the identifier representing the combination of attribute names selected by the processing in Step S330. The attribute count table 6 also includes the possible values of the attributes in the combination of attribute names, the number of users matching the respective attributes among the repeatedly replaying users, and the number of users matching the respective attributes among the non-repeatedly replaying users.

The data having the attribute count No of "1" in the attribute count table 6 illustrated in FIG. 22 represents a distribution of attribute values for each user type when the attribute name represented by "No. 1" is selected as the attribute name combination illustrated in FIG. 21, for the repeated section having the repeated section No of "1", for example. Here, the user type means whether the user is the repeatedly replaying user or the non-repeatedly replaying user.

In Step S345, the counting unit 54 determines whether or not there is row data yet to be selected in the combination attribute table 5 illustrated in FIG. 21. When the determination result is positive, the processing moves to Step S330. Then, the counting unit 54 repeats the processing of Steps S330 to S345 to count the distribution of attribute values corresponding to all the attribute names for each user type, with respect to the repeated section selected by the processing in Step S320.

On the other hand, when the result of the determination in Step S345 is negative, the processing moves to Step S350.

In Step S350, the counting unit 54 determines whether or not there is row data yet to be selected in the repeated section table 3 illustrated in FIG. 5. When the determination result is positive, the processing moves to Step S320. Then, the counting unit 54 repeats the processing of Steps S320 to S350 to figure out the distribution of attribute values corresponding to all the combinations of attribute names for each user type, with respect to all the repeated sections included in the content.

On the other hand, when the result of the determination in Step S350 is negative, the attribute distribution figuring processing illustrated in FIG. 19 is terminated.

Note that, in the processing of Step S315, the users who have replayed the target content at least once or more are acquired. However, the method for selecting users in the processing of Step S315 is not limited thereto.

For example, all the users taking the course including the target content may be acquired. Alternatively, all the users registered with the support system 10 may be acquired.

Thus, the counting unit 54 generates the attribute count table 6 illustrated in FIG. 22 by the attribute distribution figuring processing illustrated in FIG. 19.

Figure 23:
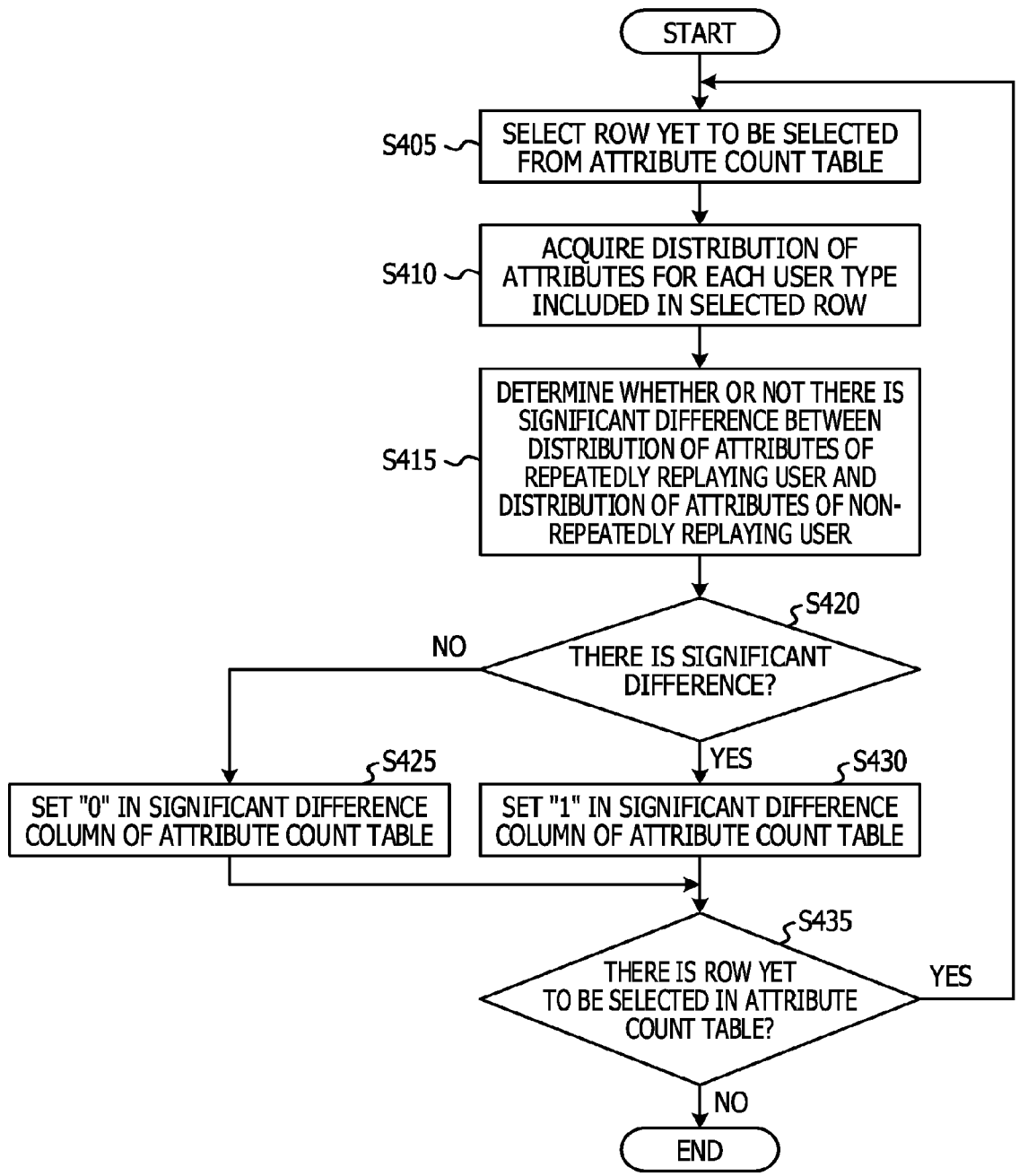
FIG. 23 is a flowchart illustrating an example of a characteristic attribute detection processing flow.

FIG. 23 is a flowchart illustrating an example of a flow of the characteristic attribute detection processing in Step S400 illustrated in FIG. 16.

First, in Step S405, the detection unit 55 selects data indicated by the attribute count No yet to be selected, from the attribute count table 6 illustrated in FIG. 22, which is generated by the counting unit 54 performing the processing of Step S300 in FIG. 16.

In Step S410, the detection unit 55 acquires a distribution of attribute values for each user type included in the data selected by the processing in Step S405. To be more specific, the detection unit 55 acquires the number of the repeatedly replaying users and the number of the non-repeatedly replaying users, which match the respective attributes, from the selected data.

For example, when the data selected by the processing in Step S405 is the data having the attribute count No of "1" illustrated in FIG. 22, the detection unit 55 acquires the number of the repeatedly replaying users having the attribute value "with captions" and the number of the repeatedly replaying users having the attribute value "without captions". Furthermore, the detection unit 55 acquires the number of the non-repeatedly replaying users having the attribute value "with captions" and the number of the non-repeatedly replaying users having the attribute value "without captions".

Meanwhile, when the data selected by the processing in Step S405 is, for example, the data having the attribute count No of "3" illustrated in FIG. 22, the detection unit 55 acquires the number of the repeatedly replaying users and non-repeatedly replaying users having the attribute value "with captions and with test browsing". Furthermore, the detection unit 55 acquires the number of the repeatedly replaying users and non-repeatedly replaying users having the respective attribute values "with captions and without test browsing", "without captions and with test browsing" and "without captions and without test browsing".

In Step S415, the detection unit 55 determines whether or not there is a significant difference between the distribution of the attribute values of the repeatedly replaying users and the distribution of the attribute values of the non-repeatedly replaying users acquired by the processing in Step S410.

A heretofore known significant difference determination algorithm such as a chi-square test, for example, to determine whether or not there is a significant difference between the distributions of the attribute values.

Here, description is given of a method for determining whether or not there is a significant difference between the distributions of the attribute values by using the chi-square test. The chi-square test is one of the statistics to measure a difference level between an actually observed distribution (observed value O) of attribute values and a stochastically obtained theoretical value (expected value E) of a distribution of attribute values. Here, the number of the repeatedly replaying users and the number of the non-repeatedly replaying users acquired in Step S410, which match the respective attributes, are used as the observed values O.

Figure 24:
FIG. 24 is a diagram illustrating an example of a calculation process of a chi-square test.

Next, FIG. 24 illustrates a method for calculating the expected value E with respect to the observed value O. FIG. 24 is a diagram illustrating a calculation process to determine, using the chi-square test, whether or not there is a significant difference between the user types in the distribution of the attribute values obtained from the data represented by the attribute count No "1" in the attribute count table 6 illustrated in FIG. 22 as an example, in other words, the distribution of the attribute values regarding the presence or absence of captions.

In this case, as described above, the number of users acquired by the processing in Step S410 is used as the observed value O. To be more specific, a, b, c, and d of the observed value O each represent the number of users for each user type of the respective attributes in the data represented by the attribute count No "1" in the attribute count table 6 illustrated in FIG. 22. More specifically, a represents the number of users having the attribute value "with captions" among the repeatedly replaying users, and b represents the number of users having the attribute value "without captions" among the repeatedly replaying users. Meanwhile, c represents the number of users having the attribute value "with captions" among the non-repeatedly replaying users, and d represents the number of users having the attribute value "without captions" among the non-repeatedly replaying users. Then, the expected value E is calculated from the observed value O by an arithmetic equation of the expected value E illustrated in FIG. 24. Note that the expected values of the numbers of users a, b, c, and d are assumed to be $E_a$, $E_b$, $E_c$, and $E_d$, respectively.

Each of the elements $E_a$, $E_b$, $E_c$, and $E_d$ of the expected value E is represented as a value obtained by multiplying a ratio of the repeatedly replaying users or the non-repeatedly replaying users to the sum of the repeatedly replaying users and the non-repeatedly replaying users by the number of users having each of the attribute values in the combination of attribute names.

For example, the expected value $E_a$ is a value obtained by multiplying the number of the repeatedly replaying users by a ratio of the users who have browsed with captions among the repeatedly replaying users and the non-repeatedly replaying users. The expected value $E_b$ is a value obtained by multiplying the number of the repeatedly replaying users by a ratio of the users who have browsed without captions among the repeatedly replaying users and the non-repeatedly replaying users. The expected value $E_c$ is a value obtained by multiplying the number of the non-repeatedly replaying users by a ratio of the users who have browsed with captions among the repeatedly replaying users and the non-repeatedly replaying users. The expected value $E_d$ is a value obtained by multiplying the number of the non-repeatedly replaying users by a ratio of the users who have browsed without captions among the repeatedly replaying users and the non-repeatedly replaying users.

Figure 25:
FIG. 25 is a diagram illustrating an example of a calculation process of a chi-square test using concrete values.

FIG. 25 is a diagram illustrating an example where the numbers of the respective attributes regarding the presence or absence of captions, which are obtained from the attribute count table 6 illustrated in FIG. 22, are applied to the observed value O and the expected value E illustrated in FIG. 24. In this case, since a=80, b=20, c=500, and d=500, the expected value $E_a$ of the repeatedly replaying users who have replayed the content with captions is 52.7, while the expected value $E_c$ of the non-repeatedly replaying users who have replayed the content with captions is 527.3. Meanwhile, the expected value $E_b$ of the repeatedly replaying users who have replayed the content without captions is 47.3, while the expected value $E_d$ of the non-repeatedly replaying users who have replayed the content without captions is 472.7.

Then, the chi-square test is executed using the observed value O and the expected value E. In the chi-square test, a chi-square value $x^2$ and a p value are calculated, and the p value is used to determine whether or not there is a significant difference between a distribution of attribute values of the repeatedly replaying users and a distribution of attribute values of the non-repeatedly replaying users. To be more specific, assuming that a threshold $\alpha$ is a significance level threshold, it is determined that there is a significant difference when $p<\alpha$ and that there is no significant difference when $p \geq \alpha$. Note that 0.05 is often used as the threshold $\alpha$ in the chi-square test. However, the threshold $\alpha$ may be another value. Moreover, the chi-square value $x^2$ represents a degree of bias in the distribution. The larger the chi-square value $x^2$, the more characteristic the bias between the distribution of the attribute values of the repeatedly replaying users and the distribution of the attribute values of the non-repeatedly replaying users.

The chi-square value $x^2$ in the chi-square test is represented by the following equation (1).

$$x^2 = \sum_\theta \frac{(O_\theta - E_\theta)^2}{E_\theta} \quad (1)$$

Here, $\theta$ represents an element of the observed value O. For example, in the case of the data represented by the attribute count No "1" in the attribute count table 6 illustrated in FIG. 22, $\theta=(a, b, c, d)$. Therefore, as illustrated in FIG. 25, when the chi-square value $x^2$ is calculated from the observed value O and the expected value E of the respective attributes of the data represented by the attribute count No "1", as an example, $x^2=31.6$. Moreover, although details are omitted, the p value in the chi-square test in this case is $1.863 \times 10^{-8}$.

Here, assuming that the threshold $\alpha$ representing the significance level is 0.05, since $p<\alpha$, the detection unit 55 may determine that there is a significant difference between the user types, regarding the combination of attributes of the data represented by the attribute count No "1".

In Step S420, the detection unit 55 selects a destination of the processing according to the result of the determination in Step S415. More specifically, when there is no significant difference between the distribution of the attribute values of the repeatedly replaying users and the distribution of the attribute values of the non-repeatedly replaying users, the processing moves to Step S425. On the other hand, where there is a significant difference, the processing moves to Step S430.

In Step S425, the detection unit 55 adds information indicating that there is no significant difference between the distribution of the attribute values of the repeatedly replaying users and the distribution of the attribute values of the non-repeatedly replaying users to the attribute count No data selected in Step S405 in the attribute count table 6 in FIG. 22. To be more specific, the detection unit 55 provides a column indicating a significant difference in the attribute count No data selected in Step S405 in the attribute count table 6, and sets "0" indicating that there is no significant difference. Also, the detection unit 55 adds the chi-square value $x^2$, which is calculated during the determination of whether or not there is a significant difference between the distribution of the attribute values of the repeatedly replaying users and the distribution of the attribute values of the non-repeatedly replaying users, to the attribute count No data selected in Step S405 in the attribute count table 6.

Note that the detection unit 55 may add the p value, which is calculated during the determination of whether or not there is a significant difference between the distribution of the attribute values of the repeatedly replaying users and the distribution of the attribute values of the non-repeatedly replaying users, to the attribute count No data selected in Step S405 in the attribute count table 6.

On the other hand, in Step S430, the detection unit 55 adds information indicating that there is a significant difference between the distribution of the attribute values of the repeatedly replaying users and the distribution of the attribute values of the non-repeatedly replaying users to the attribute count No data selected in Step S405 in the attribute count table 6. To be more specific, the detection unit 55 provides a column indicating a significant difference in the attribute count No data selected in Step S405 in the attribute count table 6, and sets "1" indicating that there is a significant difference. Also, the detection unit 55 adds the chi-square value $x^2$, which is calculated during the determination of whether or not there is a significant difference between the distribution of the attribute values of the repeatedly replaying users and the distribution of the attribute values of the non-repeatedly replaying users, to the attribute count No data selected in Step S405 in the attribute count table 6.

Note that the detection unit 55 may add the p value, which is calculated during the determination of whether or not there is a significant difference between the distribution of the attribute values of the repeatedly replaying users and the distribution of the attribute values of the non-repeatedly replaying users, to the attribute count No data selected in Step S405 in the attribute count table 6.

FIG. 26 is a diagram illustrating an example of an attribute count table 6', to which the information indicating whether or not there is a significant difference is added by the processing of Steps S425 and S430.

As illustrated in FIG. 26, a significant difference column is added to the attribute count table 6'. In the significant difference column in the data indicated by each attribute count No, for example, the value "0" is set when there is no significant difference and the value "1" is set when there is a significant difference. Also, the chi-square value $x^2$ is added to the attribute count table 6'. Note that the values of respective items in the attribute count table 6' are merely an example.

In Step S435, the detection unit 55 determines whether or not there is data indicated by the attribute count No yet to be selected in the attribute count table 6 illustrated in FIG. 22. When the determination result is positive, the processing moves to Step S405. Then, the detection unit 55 repeats the processing of Steps S405 to S435 to determine whether or not there is a significant difference in distribution of attribute values between the user types, for all the repeated sections and all the combinations of attribute names included in the attribute count table 6. Thereafter, the detection unit 55 sets information indicating whether or not there is a significant difference in the corresponding significant difference column, for all the repeated sections and all the combinations of attribute names included in the attribute count table 6.

On the other hand, when the result of the determination in Step S435 is negative, the characteristic attribute detection processing illustrated in FIG. 23 is terminated.

Thus, the detection unit 55 determines whether or not there is a significant difference for each combination of attributes in all the repeated sections by the characteristic attribute detection processing, and detects the attribute characteristic of the repeatedly replaying users for each repeated section. The support information generation processing illustrated in FIG. 16 ends upon completion of the above processing.

Furthermore, the support apparatus 50 according to this embodiment executes support information provision processing upon receipt of the support information acquisition requests from the student terminal 30 and the teacher terminal 40, for example.

Figure 27:
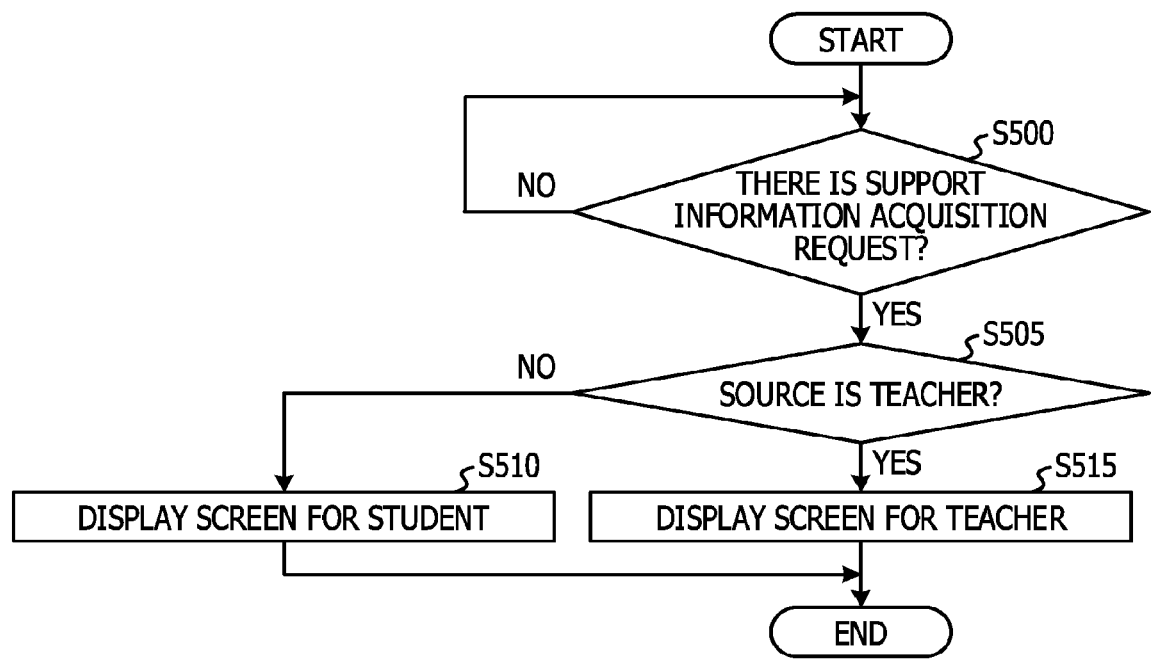
FIG. 27 is a flowchart illustrating an example of a support information provision processing flow.

FIG. 27 is a flowchart illustrating an example of a flow of the support information provision processing according to this embodiment. Note that the support information generation processing is assumed to be completed before execution of the support information provision processing.

In Step S500, the communication unit 51 determines whether or not a support information acquisition request is received from the communication line 60. When the determination result is negative, the processing of Step S500 is repeated until the support information acquisition request is received. On the other hand, when the determination result is positive, the processing moves to Step S505.

For example, a header of a telegram received from the communication line 60 includes a telegram ID for identifying the type of the telegram. The communication unit 51 may determine whether or not the type of the telegram received is the support information acquisition request, by reading the telegram ID in the header.

Note that, when the result of the determination in Step S500 is positive, the communication unit 51 notifies the output unit 56 of the received support information acquisition request.

In Step S505, the output unit 56 determines whether or not the source of the support information acquisition request is a teacher. Then, the processing moves to Step S510 when the determination result is negative, and moves to Step S515 when the determination result is positive.

Since the support information acquisition request includes the user ID or teacher ID indicating the source of the support information acquisition request, for example, the output unit 56 may determine whether or not the source of the support information acquisition request is the teacher.

Then, in Step S510, the output unit 56 outputs display data for displaying support information 80 illustrated in FIG. 28, for example, on a screen of the student terminal 30 that is the source of the support information acquisition request, to the student terminal 30 through the communication unit 51.

Figure 29:
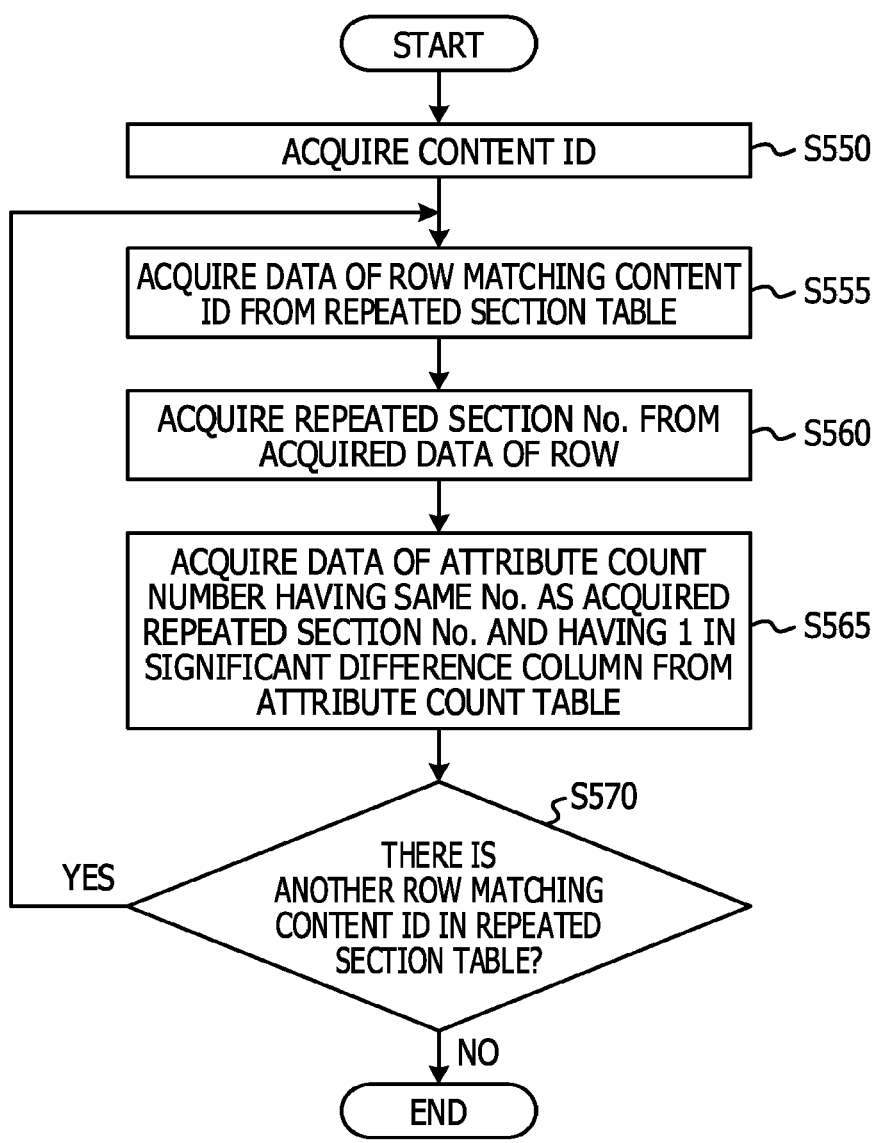
FIG. 29 is a flowchart illustrating an example of an acquisition processing flow according to the first embodiment.

FIG. 29 is a flowchart illustrating an example of a flow of processing of acquiring an attribute characteristic of the repeatedly replaying users, which is executed in Step S510. Note that, here, description is given of the case where there is one attribute characteristic of the repeatedly replaying users for the same repeated section.

In Step S550, the output unit 56 acquires the content ID included in the support information acquisition request.

In Step S555, the output unit 56 extracts one row of data including the same content ID as that acquired by the processing in Step S550, from the repeated section table 3, by referring to the target content column of the repeated section table 3 illustrated in FIG. 5.

In Step S560, the output unit 56 acquires the repeated section No from the data in the repeated section table 3 acquired by the processing in Step S555.

In Step S565, from the attribute count table 6' illustrated in FIG. 26, the output unit 56 acquires data of the attribute count No having the same repeated section No as that acquired by the processing in Step S560 and having "1" set as the value in the significant difference column. Then, the output unit 56 associates the acquired attribute count No data with the data in the repeated section table 3 illustrated in FIG. 5 having the same repeated section No as that including the acquired attribute count No data. Thereafter, the output unit 56 extracts the repeated section associated with the attribute characteristic of the repeatedly replaying users, from the repeated sections of the content.

In Step S570, the output unit 56 determines whether or not the repeated section table 3 includes data yet to be extracted by the processing in Step S555, the data including the same content ID as that acquired in Step S550. Then, when the determination result is positive, the processing moves to Step S555 to extract another repeated section associated with the attribute characteristic of the repeatedly replaying users. On the other hand, when the determination result is negative, this acquisition processing is terminated.

As described above, among the repeated sections of the content, the repeated section associated with the attribute characteristic of the repeatedly replaying users is referred to as a specific repeated section.

Then, as illustrated in FIG. 28, the output unit 56 generates display data for displaying the attribute characteristic of the repeatedly replaying users at a position corresponding to the specific repeated section on a display bar 85 indicating the content replay position by the position of a thumb 86. To be more specific, the output unit 56 generates display data for displaying the attribute characteristic of the repeatedly replaying users at the head of the position corresponding to the specific repeated section on the display bar 85. In the attribute count table 6' illustrated in FIG. 26, for example, when the data having the attribute count No "1" is the attribute characteristic of the repeatedly replaying users, "users with captions" is displayed since there are many users browsing the content with captions in the repeated section.

Then, the output unit 56 outputs the generated display data to the student terminal 30 that is the source of the support information acquisition request, through the communication unit 51.

In the screen example of the student terminal 30 illustrated in FIG. 28, balloons 81, 82, and 83 on the display bar 85 indicate the positions of the specific repeated section. In each of the balloons 81 to 83, a characteristic attribute in each of the specific repeated sections is displayed.

The display of the specific repeated sections of the content and the characteristic attributes in the specific repeated sections on the screen of the student terminal 30 as described above enables the user to know which section of the content is repeatedly replayed by the user having what kind of attributes. Therefore, the user may figure out which section of the content to pay attention to for learning. Moreover, the user may study while being previously aware of the history of learning by other students. Thus, the quality of learning may be improved, such as learning focusing on a section with which those having the same attributes are likely to have a problem.

Note that the method for displaying the specific repeated sections of the content to be displayed on the screen of the student terminal 30 is not limited thereto. For example, the balloons displaying the characteristic attributes may be displayed only for the specific repeated section having the same characteristic attribute in the specific repeated section and the same attribute value of the user represented by the user ID included in the support information acquisition request, among the specific repeated sections.

To be more specific, when the user represented by the user ID included in the support information acquisition request is a college student, for example, the balloon 83 is not displayed, indicating a specific repeated section to be repeatedly replayed by a junior high-school student user.

In this case, only the section repeatedly replayed by the user having the same attribute values is displayed on the student terminal 30. The user tends to speculate that the section repeatedly replayed by those having the same attribute values may be the content also important to himself/herself. Thus, the user may know which section of the content to focus on in learning. Therefore, the user may learn further narrowing down the section to pay attention to, compared with the case where the specific repeated section repeatedly replayed by the users having different attribute values is also displayed on the student terminal 30.

Moreover, since the positions of the specific repeated sections are displayed on the display bar 85, the user may easily move the content replay position to the specific repeated section by an operation such as fast-forward and rewind for example.

Moreover, for example, the output unit 56 may output display data for changing the display position of the thumb 86 at a timing when a log indicating a fast-forward or rewind operation is recorded in the content browsing log table 1 illustrated in FIG. 2, by referring to the user action log storage unit 61. To be more specific, the output unit 56 outputs display data for moving the display position of the thumb 86 to the specific repeated section closest to the display position of the thumb 86 before execution of the fast-forward or rewind operation. Such changing of the display position of the thumb 86 enables cueing of the specific repeated section. Thus, the time spent by the user to move the content replay position to the specific repeated section may be reduced.

Furthermore, the user may utilize the support information 80 in various ways to match his/her own learning style, such as carefully learning by more slowly replaying the content since the replay speed is adjusted when the content replay position enters the specific repeated section.

Alternatively, no characteristic attributes, in other words, no balloons 81 to 83 may be displayed on the screen of the student terminal 30. Even when no characteristic attributes are displayed, the use of the cueing function described above enables the user to match the content replay position with the specific repeated section.

Meanwhile, in Step S515, the output unit 56 outputs the display data through the communication unit 51 to the teacher terminal 40 that is the source of the support information acquisition request. The display data is for displaying the support information 90 illustrated in FIG. 30, for example, on the screen of the teacher terminal 40.

The flow of the processing of acquiring attributes characteristic of the repeatedly replaying users in Step S515 may be realized in the same manner as the processing flow illustrated in FIG. 29. Moreover, the output unit 56 displays a content replay condition graph 96 with the replay frequency as the vertical axis and the replay time as the horizontal axis, by referring to the row matching the target content ID, from the replay frequency count table 2' illustrated in FIG. 4. Since the horizontal axis of the replay condition graph 96 corresponds to the position of the content display bar, the teacher may replay the content in the repeated section and confirm the content by operating the thumb of the content. More specifically, the teacher may check what specific details of the content are like in a section with which the students are likely to have a problem.

Moreover, the output unit 56 outputs, to the teacher terminal 40, display data for displaying a mark 92 at each of the positions corresponding to the repeated sections in the replay condition graph 96, the mark indicating that the position is the repeated section. Note that the mark 92 may be in any display form, such as a symbol and a graphic, as long as the mark may tell the teacher that the display position of the mark is the repeated section. Moreover, the display color of the mark 92 is also not limited.

Figure 30:
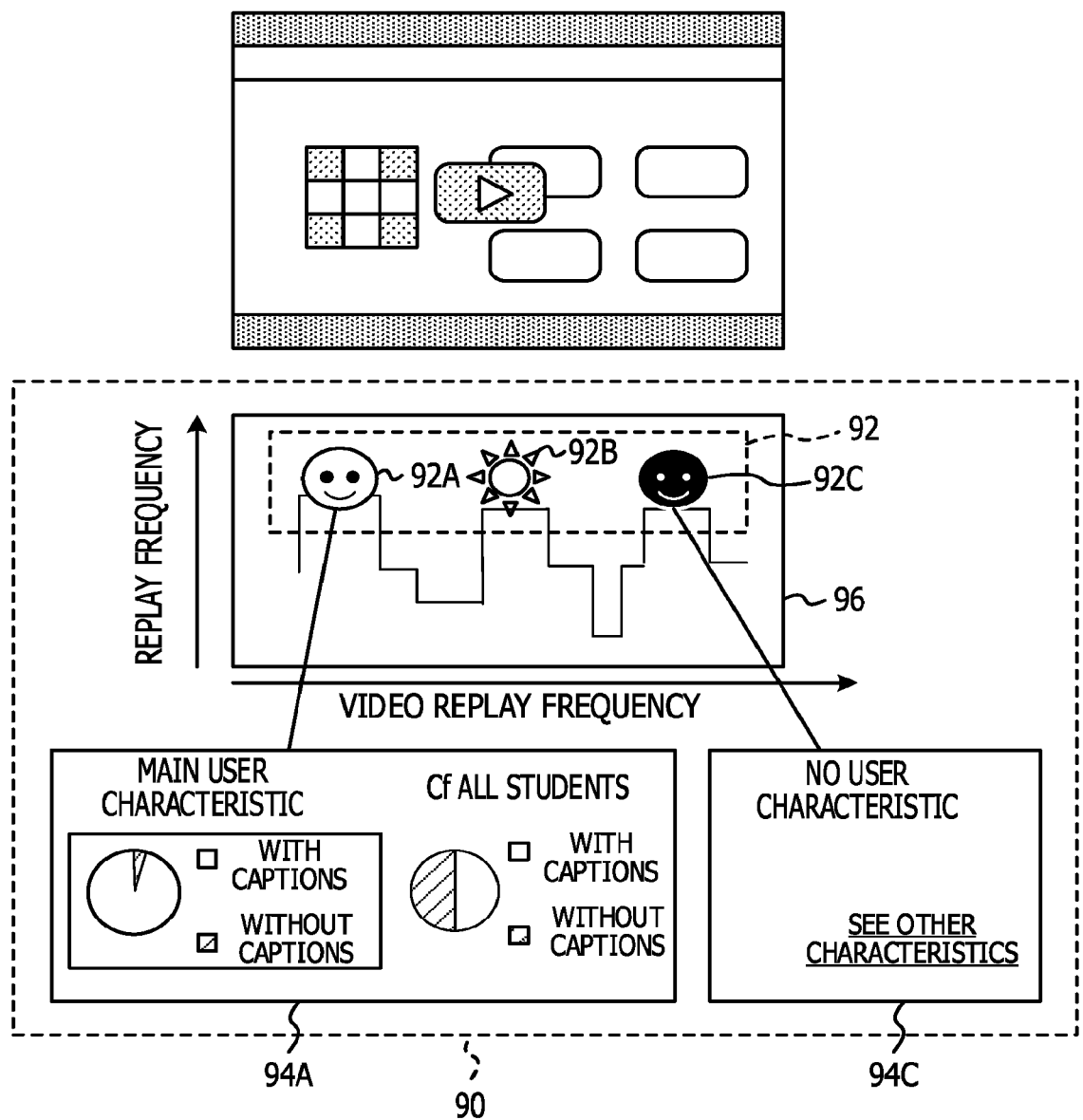
FIG. 30 is a diagram illustrating an example of support information displayed on the teacher terminal according to the first embodiment.

Alternatively, at least one of the shape and color of the mark 92 may be changed according to the attribute characteristic of the repeatedly replaying users. A mark 92A illustrated in FIG. 30 represents a specific repeated section having a significant difference in presence or absence of captions, for example. A mark 92B represents a specific repeated section having a significant difference in gender, for example. A mark 92C represents a repeated section having no attribute characteristic of the repeatedly replaying users, for example.

Furthermore, the mark 92 may be changed according to the degree of bias in the attribute characteristic of the repeatedly replaying users. The changing of the mark 92 according to the degree of bias means changing the mark 92 according to the magnitude of the chi-square value $x^2$ indicating the degree of particular bias only in the repeatedly replaying users compared with the non-repeatedly replaying users.

When the mark 92 is selected by the teacher, the output unit 56 outputs, to the teacher terminal 40, display data (attribute display) for displaying the distribution of attribute values characteristic of the repeatedly replaying users in the repeated section corresponding to the mark 92.

An attribute display 94A illustrated in FIG. 30 is a display to be displayed on the screen of the teacher terminal 40 when the mark 92A is selected by the teacher. In the attribute display 94A, pie charts are displayed, representing a distribution of attribute values of the repeatedly replaying users and a distribution of attribute values of the non-repeatedly replaying users regarding the presence or absence of captions, for example.

In an attribute display 94C, characters with a link to a dialog for displaying various information are displayed, such as "see other characteristics", for example, since there is no attribute characteristic of the repeatedly replaying users. Then, when "see other characteristics" is selected by the teacher, the attribute count table 6' illustrated in FIG. 26, for example, may be displayed.

Thus, the output unit 56 outputs the display data for displaying the support information 80 to support learning of the user to the student terminal 30 by the support information provision processing illustrated in FIG. 27. The output unit 56 also outputs the display data for displaying the support information 90 to support improvement of the lecture by the teacher or the content to the teacher terminal 40.

Accordingly, the support apparatus 50 according to this embodiment may display the content repeated section, the attributes characteristic of the repeatedly replaying users in the repeated section and the distribution of the attribute values on the teacher terminal 40 as the support information 90. Moreover, the support apparatus 50 according to this embodiment may display the content repeated section and the attributes characteristic of the repeatedly replaying users in the repeated section on the student terminal 30.

The display of the support information 90 on the screen of the teacher terminal 40 enables the teacher to determine which section of the content is repeated and the reason of such a repeat operation.

For example, the teacher may speculate that a section repeatedly browsed by the students with captions is a section difficult for those who are not native speakers of English to understand. Also, the teacher may speculate that a section repeatedly browsed only by the students who have not previously seen another specific content is a section that may only be understood by those having specific previous knowledge. Moreover, the teacher may speculate that a section repeatedly browsed by the students who have previously seen the test corresponding to the content is a section including contents related to questions on the test, and thus is a section replayed for a review.

The support system 10 according to this embodiment may figure out not only a section of the content repeatedly browsed by the student, that is, a section with which the student is likely to have a problem, but also the reason why the student has the problem with that section. Therefore, the teacher may utilize the support system 10 to improve the contents of the lecture, such as improving the details of the content and filling in the details of the content in a face-to-face lecture.

Moreover, displaying the mark 92 on the screen of the teacher terminal 40 enables the teacher to know the kinds of the attributes characteristic of the repeatedly replaying users, the degree of bias in the attributes characteristic of the repeatedly replaying users, and the like. Therefore, the teacher may plan to correct the content before looking at the details of the content and the like. For example, the teacher may plan to correct the content, such as correcting first a section difficult for anyone to understand, correcting first a clearly characterized section, and correcting first a section including a matter to be easily coped with by the teacher.

Furthermore, displaying the attribute display 94A on the screen of the teacher terminal 40 enables the teacher to find out a ratio of the actual number of users, the extent of the number of users and the like for each attribute value, among the attributes characteristic of the repeatedly replaying users, from the pie charts.

Note that, when the teacher previously has some kind of hypothesis about the difficulty of the content, hypothesis testing may be performed, such as specifying the attribute characteristic of the repeatedly replaying users related to the teacher's hypothesis from the teacher terminal 40 and checking if the attribute is included in the repeated section.

To be more specific, when it is assumed that the pronunciation of English words spoken by the teacher in the lecture is difficult to understand, the teacher terminal 40 may be used to check if there is a repeated section in which the student has browsed the content with captions. Furthermore, the teacher may explicitly specify the user population having the attributes characteristic of the repeatedly replaying users from the teacher terminal 40 and further narrowing down the users to be used for counting of the repeatedly replaying users. For example, the teacher may specify to display the attribute display 94A from the teacher terminal 40 when the user population is limited to males among the repeatedly replaying users.

Note that the support apparatus 50 according to this embodiment acquires a section repeatedly replayed by the user and the attributes characteristic of the repeatedly replaying users and the distribution of the attribute values in the section repeatedly replayed by the user. However, the attributes characteristic of the repeatedly replaying users and the distribution of the attribute values may be acquired not only for the section repeatedly replayed by the user but also for a section fast-forwarded by the user, for example.

For example, referring to the content browsing log table 1 illustrated in FIG. 2, the log analysis unit 52 acquires the time in the position column corresponding to "fast-forward" in the action column of the content browsing log table 1 for each content. Also, referring to the content browsing log table 1, the log analysis unit 52 acquires the time in the position column of the row including a "stop" log corresponding to the acquired "fast-forward". Then, the log analysis unit 52 acquires a non-replay section that is a section in which the content is skipped without being replayed by the user, based on the "fast-forward" start time and the "stop" time.

As described above, the log analysis unit 52 acquires the non-replay section of the content to analyze which section of the content is skipped without being replayed by which user and how many times that section is skipped.

Then, the log analysis unit 52 sets the non-replay section, which is analyzed from the fast-forward and stop positions of the content, in the section column. Thereafter, the log analysis unit 52 sets the frequency of fast-forwarding without replaying by the user in the non-replay section in a non-replay frequency column, and the user who has fast-forwarded the non-replay section without replaying in a non-replay user column, thereby generating a non-replay frequency count table.

The non-replay frequency count table is a table having the same data structure as that of the replay frequency count table 2' in the replay operation illustrated in FIG. 4. Therefore, the support apparatus 50 may acquire the non-replay section, the attributes characteristic of the users who have fast-forwarded the non-replay section and the distribution of attribute values by performing the same processing as that performed to generate the attribute count table 6' illustrated in FIG. 26 from the replay frequency count table 2'.

Therefore, the teacher may find out which section of the prepared content is a redundant section for whom. This may help the teacher to improve the content and how to proceed with the lecture. Thus, the student's motivation for learning may be improved. Moreover, the student may study while being previously aware of the history of learning by other students. Thus, the quality of learning may be improved, such as studying a section fast-forwarded and skipped by the other students when he/she has time.

Note that the fast-forwarding also includes an operation of replaying at a speed faster than a specified replay speed, such as a double speed replay, for example.

Moreover, the support apparatus 50 according to this embodiment figures out a distribution of attribute values corresponding to all the combinations of attribute names for each user type. For example, even when the attribute names managed by the support apparatus 50 are added later, all the combinations of attribute names including the added attribute names are automatically generated by the processing in Step S310 illustrated in FIG. 19.

Therefore, the support apparatus 50 according to this embodiment does not have to correct the support information generation processing illustrated in FIG. 16 even when there is a change in specifications such as subsequent addition of the attribute names managed by the support apparatus 50. Thus, an increase in modification cost associated with a change in specifications may be suppressed. Moreover, a combination pattern of the attribute names does not have to be specified in advance. Thus, even a combination of attribute names representing characteristics unexpected by the teacher may be detected as a reason for repeat. More specifically, not only the attributes related to lectures in a specific course but also information about other lectures in the same course and lectures in another course different from the specific course may be handled, making it possible to take a more comprehensive view of the learning situation.

Second Embodiment

As for the support apparatus 50 according to the first embodiment, the description is given of the case where there is one attribute characteristic of the repeatedly replaying users for the same repeated section during displaying on the screens of the student terminal 30 and the teacher terminal 40 by the output unit 56. In this embodiment, description is given of various display modes of characteristic attributes when there are many attributes characteristic of the repeatedly replaying users in the same repeated section.

When there are many attributes characteristic of the repeatedly replaying users in one repeated section, contents of support information 80 and 90 displayed on the student terminal 30 and the teacher terminal 40 become more complicated with an increase in the number of the attributes characteristic of the repeatedly replaying users.

Therefore, when there are many attributes characteristic of the repeatedly replaying users in one repeated section, the support apparatus according to this embodiment selects attributes characteristic of the repeatedly replaying users to be displayed as the support information 80 and 90.

Figure 31:
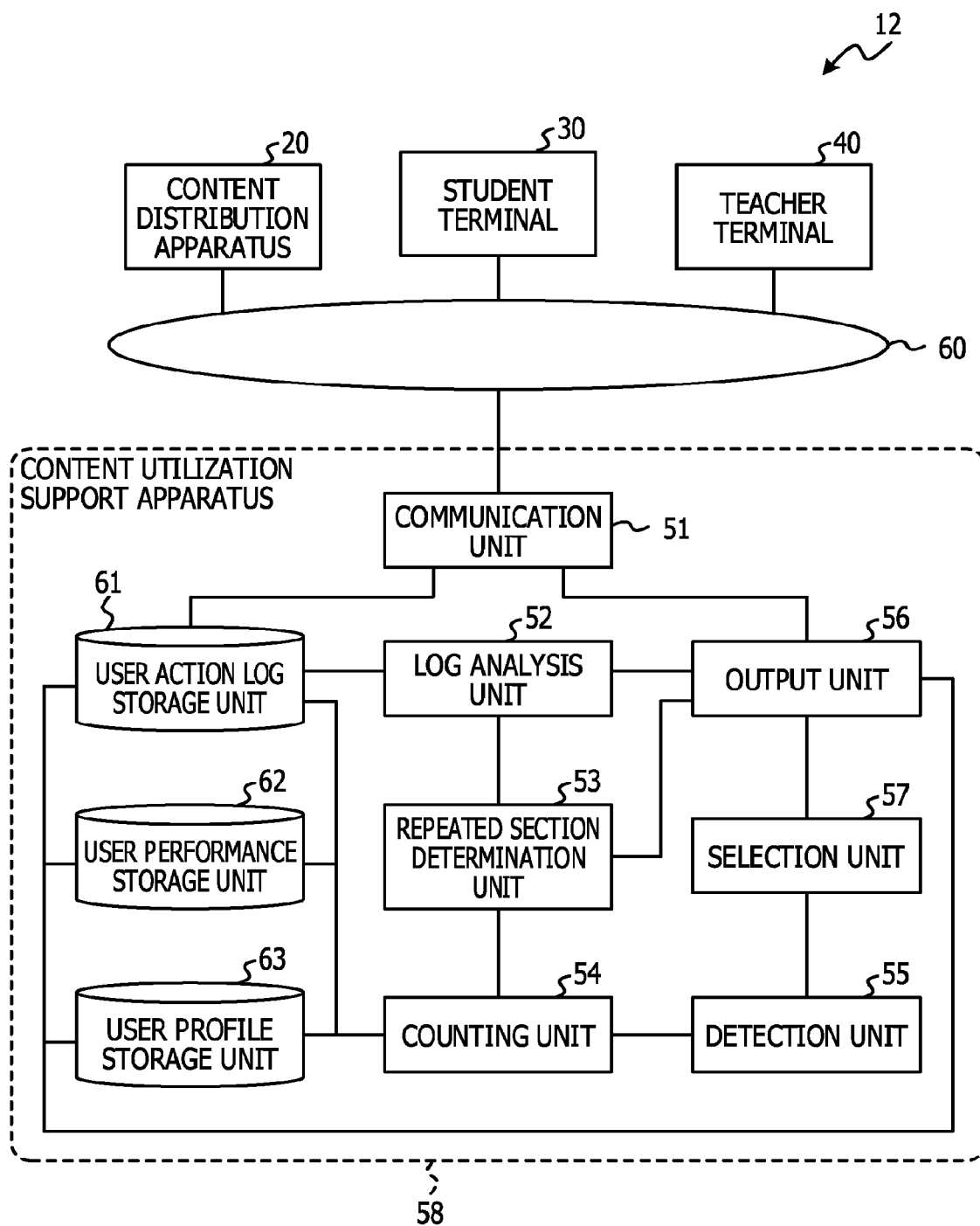
FIG. 31 is a diagram illustrating an example of an educational content utilization support system according to a second embodiment.

FIG. 31 is a diagram illustrating an example of an educational content utilization support system 12 according to this embodiment.

The educational content utilization support system 12 according to this embodiment is different from the educational content utilization support system 10 according to the first embodiment in that the content utilization support apparatus 50 is replaced by a content utilization support apparatus 58. Note that, hereinafter, the "educational content utilization support system 12" is referred to as the "support system 12" and the "content utilization support apparatus 58" is referred to as the "support apparatus 58".

Moreover, the support apparatus 58 according to this embodiment is different from the support apparatus 50 according to the first embodiment in further including a selection unit 57.

The selection unit 57 is connected to the detection unit 55 and the output unit 56. The selection unit 57 refers to the attribute count table 6' illustrated in FIG. 26. When the number of the attributes characteristic of the repeatedly replaying users is larger than a threshold β in one repeated section, the selection unit 57 limits the number of the attributes characteristic of the repeatedly replaying users to be displayed as the support information 80 and 90 to the threshold β or less in association with the selected repeated section.

As for the repeated section in which the attributes characteristic of the repeatedly replaying users are selected by the selection unit 57, the output unit 56 outputs display data for displaying only the selected attributes to the student terminal 30 and the teacher terminal 40.

Figure 32:
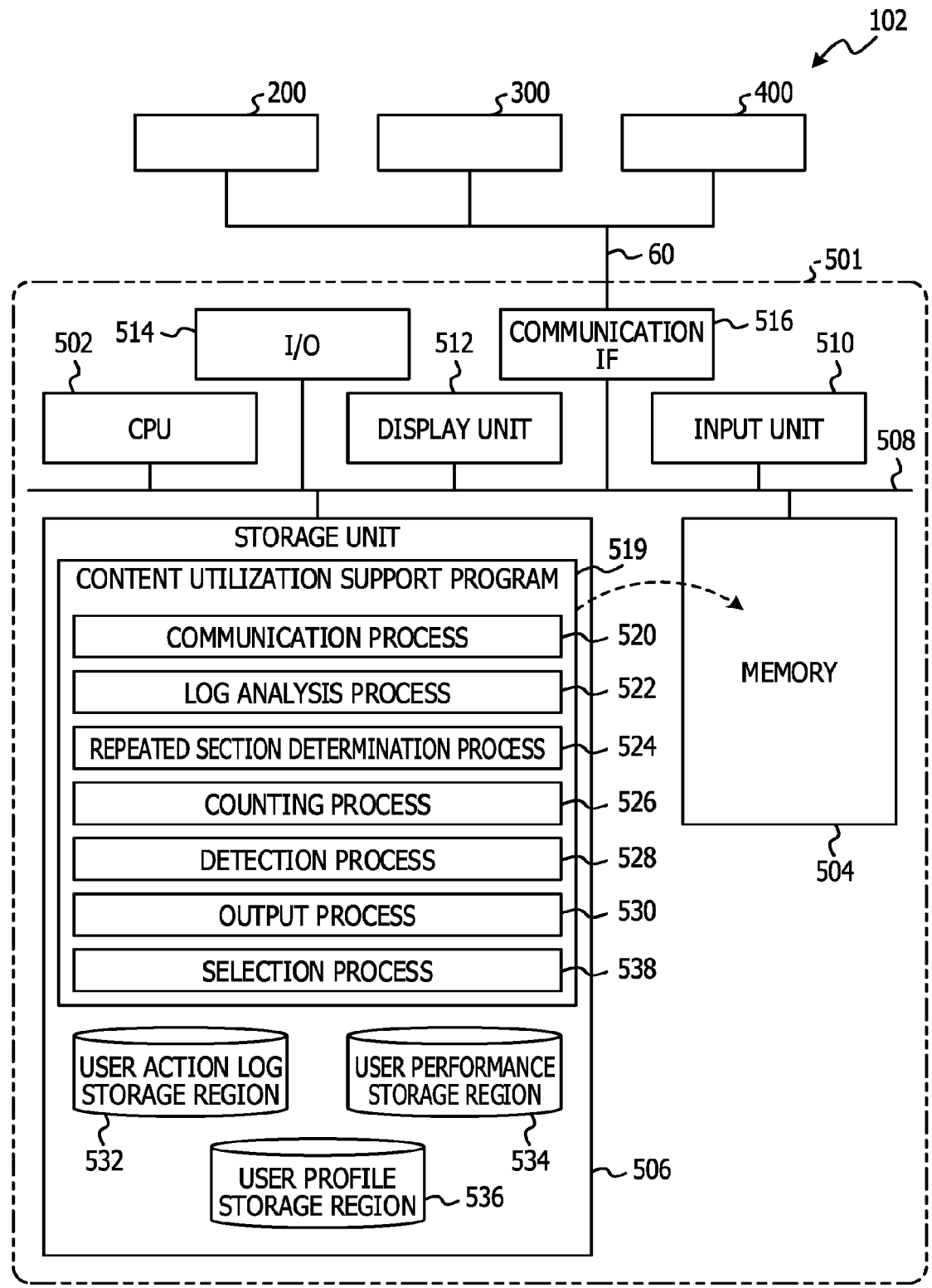
FIG. 32 is a diagram illustrating an example of a computer system that realizes the educational content utilization support system according to the second embodiment.

Next, FIG. 32 illustrates a computer system 102 as an example where the content distribution apparatus 20, the student terminal 30, the teacher terminal 40 and the support apparatus 58, which are included in the support system 12, may be realized using computers.

The computer system 102 is different from the computer system 100 according to the first embodiment in that the computer 500 is replaced by a computer 501.

Also, the computer 501 is different from the computer 500 according to the first embodiment in that a selection process 538 is added to a content utilization support program 519.

The CPU 502 reads the content utilization support program 519 from the storage unit 506, develops the program in the memory 504, and executes the content utilization support program 519, thereby allowing the computer 501 to operate as the support apparatus 58 illustrated in FIG. 31. Also, the CPU 502 executes the selection process 538, thereby allowing the computer 501 to operate as the selection unit 57 illustrated in FIG. 31.

Note that the support apparatus 58 may also be realized using a semiconductor integrated circuit, more specifically, an ASIC or the like, for example.

Next, description is given of operations of the support apparatus 58 according to this embodiment. As in the case of the support apparatus 50 according to the first embodiment, the support apparatus 58 according to this embodiment executes support information provision processing upon receipt of support information acquisition requests from the student terminal 30 and the teacher terminal 40, for example. Note that the support information generation processing illustrated in FIG. 16 is assumed to be completed before execution of the support information provision processing.

The support information provision processing according to this embodiment has the same flow as that of the flowchart of the support information provision processing according to the first embodiment illustrated in FIG. 27. However, the support information provision processing according to this embodiment is different in processing of acquiring attributes characteristic of the repeatedly replaying users in Steps S510 and S515 illustrated in FIG. 27.

Figure 33:
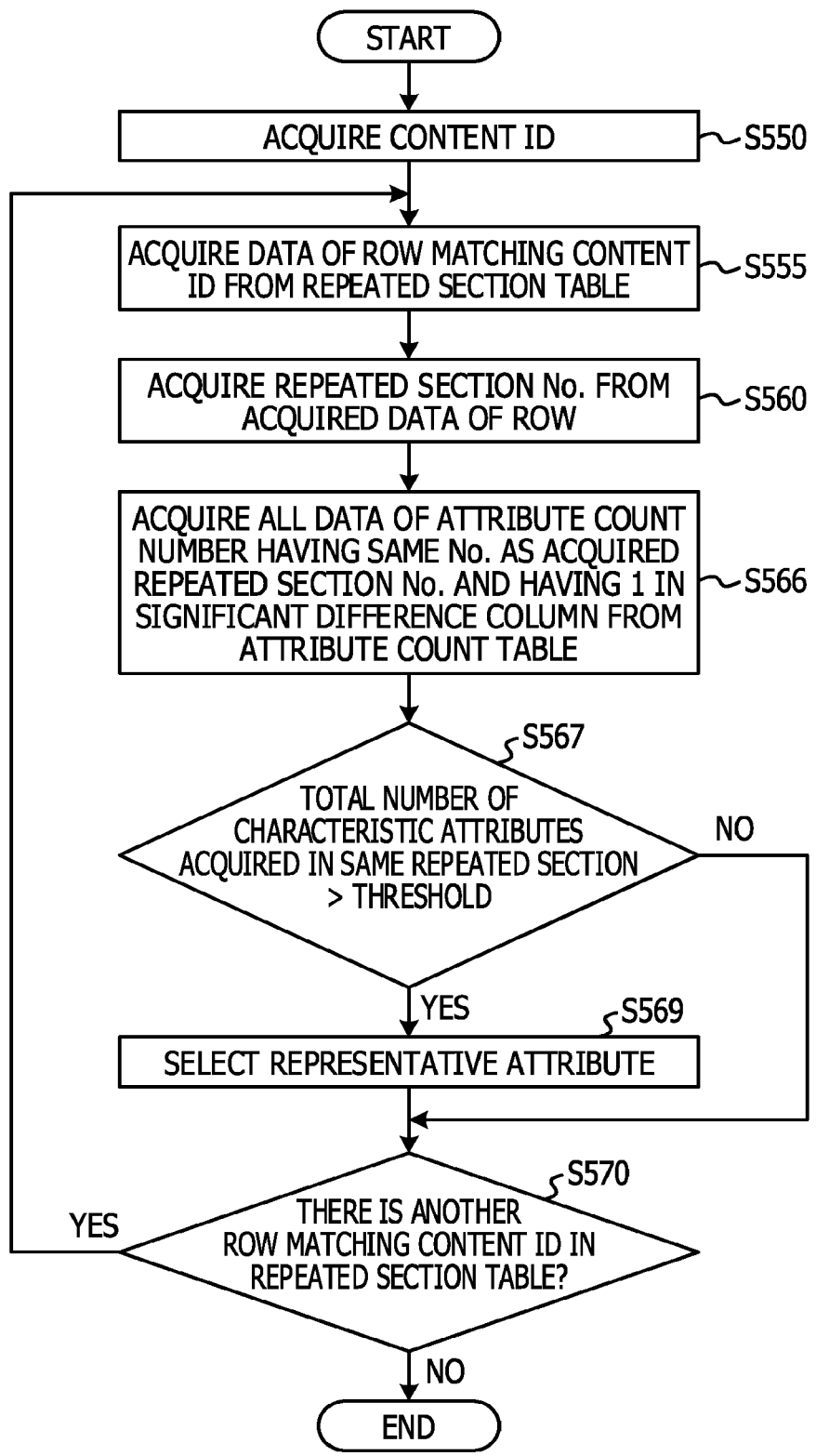
FIG. 33 is a flowchart illustrating an example of an acquisition processing flow according to the second embodiment.

FIG. 33 is a flowchart illustrating an example of a flow of the processing of acquiring the attributes characteristic of the repeatedly replaying users, which is executed in Step S510 in this embodiment. The acquisition processing illustrated in FIG. 33 is different from the acquisition processing in Step S510 according to the first embodiment illustrated in FIG. 29 in that the processing of Step S565 is replaced by processing of Step S566 and processing of Steps S567 and S569 is further added.

In Step S566, the output unit 56 acquires all attribute count No data from the attribute count table 6' illustrated in FIG. 26, the data having the same repeated section No as that acquired by the processing in Step S560 and having "1" set as the value in the significant difference column. Then, the output unit 56 associates characteristic attributes represented by the acquired attribute count No data with the repeated section acquired by the processing in Step S560.

In Step S567, the selection unit 57 determines whether or not the total number of the attribute count No data acquired by the processing in Step S566, that is, the number of the attributes characteristic of the repeatedly replaying users is larger than the threshold $\beta$. When the determination result is positive, the processing moves to Step S569. On the other hand, when the determination result is negative, the selection unit 57 randomly selects any one of the characteristic attributes, for example, as a representative attribute, and then moves to Step S570.

In Step S569, the selection unit 57 selects $\beta$ characteristic attributes from the number of attributes characteristic of the repeatedly replaying users, which is larger than the threshold $\beta$. Then, the selection unit 57 randomly selects any one of the characteristic attributes, for example, from among the selected attributes as a representative attribute, and then associates the representative attribute with the repeated section acquired by the processing in Step S560.

The output unit 56 displays the representative attribute on the screens of the student terminal 30 and the teacher terminal 40.

Figure 34:
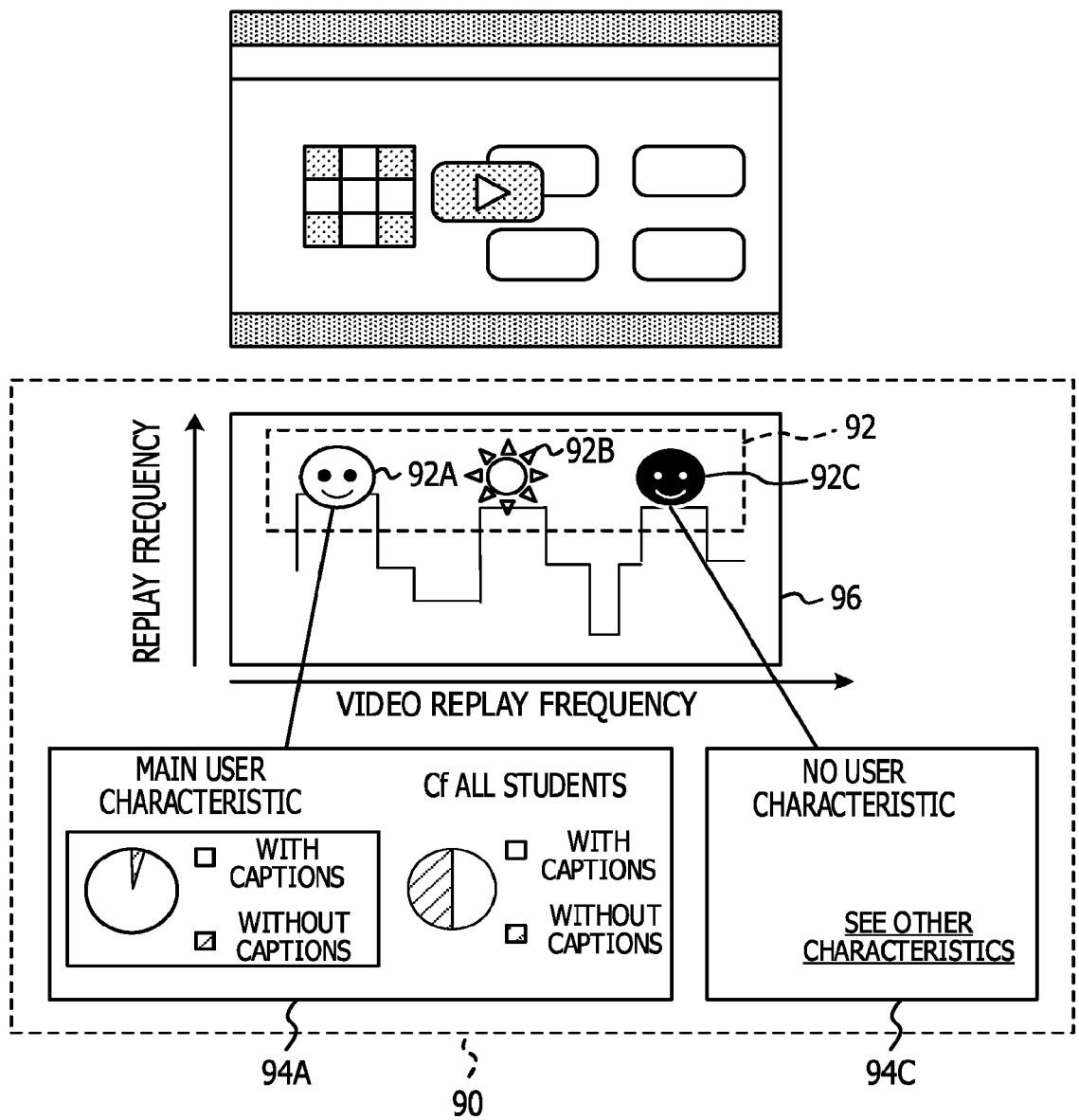
FIG. 34 is a diagram illustrating an example of support information displayed on a teacher terminal according to the second embodiment.

FIG. 34 is a diagram illustrating a screen example of the teacher terminal 40 displayed by the support apparatus 58 according to this embodiment.

As illustrated in FIG. 34, when many attributes characteristic of the repeatedly replaying users are included in the same repeated section, characters with a link for displaying information about other attributes characteristic of the repeatedly replaying users are displayed in the attribute display 94A, such as "see other characteristics", for example. Then, when "see other characteristics" is selected by the teacher, the information about the other attributes characteristic of the repeatedly replaying users, other than the representative attribute selected by the selection unit 57, is displayed.

In the screen example of the student terminal 30 illustrated in FIG. 28, again, when many attributes characteristic of the repeatedly replaying users are included in the same repeated section, characters with a link such as "see other characteristics" may be displayed in a balloon such as a balloon 81, for example. In this event, when "see other characteristics" in the balloon 81 is selected by the student, for example, other attributes characteristic of the repeatedly replaying users included in the repeated section corresponding to the position of the balloon 81 other than the representative attribute selected by the selection unit 57 are displayed in the balloon 81.

As described above, when many attributes characteristic of the repeatedly replaying users are included in the same repeated section, the support apparatus 58 according to this embodiment limits the number of the attributes characteristic of the repeatedly replaying users to be displayed on the screens of the student terminal 30 and the teacher terminal 40 to the threshold $\beta$ or less. Therefore, complication caused by a volume of information displayed on the screens may be suppressed.

Note that, needless to say, the selection unit 57 does not have to limit the number of attributes to be displayed on the screens, among the attributes characteristic of the repeatedly replaying users in the same repeated section, to the threshold $\beta$ or less as occasion calls.

Note that the method for selecting the attributes characteristic of the replaying users is not limited to the above example. The selection unit 57 may select the attributes characteristic of the repeatedly replaying users by using a value calculated using the heretofore known significant difference determination algorithm executed by the detection unit 55 to determine whether or not there is a significant difference in the processing of Step S415 illustrated in FIG. 23. To be more specific, when the detection unit 55 executes a chi-square test to determine whether or not there is a significant difference, the selection unit 57 refers to the attribute count table 6' illustrated in FIG. 26 to select the number of attributes, which is not more than the threshold β, in descending order of chi-square value $x^2$, from among the attributes characteristic of the repeatedly replaying users.

Alternatively, the selection unit 57 may refer to the attribute count table 6' to select the number of attributes, which is not more than the threshold β, in descending or ascending order of the number of the repeatedly replaying users, for example, from among the attributes characteristic of the repeatedly replaying users.

Moreover, as described above, in the attribute count table 6', a distribution of attribute values is figured out for each combination of attribute names listed in the combination attribute table 5 illustrated in FIG. 21. Therefore, when there is already a significant difference between user types as in the attributes in an upper-level attribute name combination including a lower-level attribute name combination, only the upper-level attribute name combination may be selected to select the attributes to be displayed on the screen, from among the attributes characteristic of the replaying users.

To be more specific, when there is already a significant difference between user types as for "presence or absence of captions", for example, a combination of "presence or absence of captions" and "gender" is not displayed even when there is a significant difference between user types in the combination of "presence or absence of captions" and "gender". This is because there is considered to be less desire to display a significant difference between user types as for the combination of "presence or absence of captions" and "gender", which are lower-level attribute names included in "presence or absence of captions", since there is already a significant difference between user types in "presence or absence of captions".

Moreover, for example, the selection unit 57 calculates a correlation value indicating correlation between user performance attributes and the combination of attribute names (possible values of the attributes) listed in the combination attribute table 5 illustrated in FIG. 21. Then, the selection unit 57 may select attributes to be displayed in descending order of correlation value with the performance attributes, from among the attributes characteristic of the repeatedly replaying users.

In this case, since the attribute names that affect the user performance are preferentially displayed as the support information 80 and 90, for example, the teacher may find out a section likely to affect the performance of the student within the content, and may utilize that section to improve the details of the content and to consider the student guiding principle. Likewise, the student may also find out a section likely to affect his/her own performance within the content, and may utilize that section to make a learning plan such as preferentially learning the section.

As described above, the support apparatus 58 according to this embodiment may select and display attributes to be displayed as appropriate, as for many attributes characteristic of the repeatedly replaying users, on the screens of the student terminal 30 and the teacher terminal 40. Therefore, detailed information about the many characteristic attributes may be provided in response to requests of the teacher and the student while suppressing complicated display on the student terminal 30 and the teacher terminal 40.

Although the disclosed technology has been described above using the respective embodiments, the disclosed technology is not limited to the scope described in the embodiments. Various changes and modifications may be added to the respective embodiments without departing from the scope of the disclosed technology. Embodiments having such changes or modifications added thereto are also included in the technical scope of the disclosed technology. For example, the processing order may be changed without departing from the scope of the disclosed technology.

Moreover, in the above embodiments, the description is given of the configuration in which the content utilization support program is previously stored (installed) in the storage unit. However, the disclosed technology is not limited thereto. The content utilization support program according to the disclosed technology may also be provided in the form of being recorded in a computer readable recording medium. For example, the content utilization support program according to the disclosed technology may also be provided in the form of being recorded in a portable recording medium such as a CD-ROM, a DVD-ROM, and a USB memory. Alternatively, the content utilization support program according to the disclosed technology may also be provided in the form of being recorded in a semiconductor memory or the like such as a flash memory.

Note that, in the above embodiments, the attribute table 4 illustrated in FIG. 20 is generated using all the attribute names and possible values of the attributes, which are defined in the action attribute definition table 7, the performance attribute definition table 8, and the user profile attribute definition table 9. However, when attribute names and possible values of attributes related to a course to be taken are defined, for example, only the attributes may be used to generate the attribute table 4. In the case of a content included in a mathematics course, for example, only performance of the course related to mathematics may be acquired from the performance attribute definition table 8. In this case, since the number of combinations of attributes to be processed is reduced, processing time of the support apparatus 50 and the support apparatus 58 may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A content utilization support method executed by a computer, comprising:

detecting a section of video content based on operation information on the video content and user information, the detected section of the video content being a section of the video content whose play frequency by a single user is more than a predetermined value, the operation information including a played section of the video content, the user information including a plurality of kinds of attribute information of the user who has played the played section of the video content;

identifying a first group of users whose play frequency of the detected section of the video content is greater than a predetermined value, and identifying a second group of users whose play frequency of the detected section of the video content is equal to or less than the predetermined value;

comparing, for each of the plurality of kinds of attribute information, a first distribution that is a distribution of attribute information of users in the identified first group of users and a second distribution that is a distribution of attribute information of users in the identified second group of users;

identifying the plurality of kinds of attribute information whose difference between the first distribution and the second distribution is larger than a predetermined threshold based on the comparing; and outputting information that indicates the detected section and the plurality of kinds of attribute information whose difference between the first distribution and the second distribution is larger than the predetermined threshold.

2. The content utilization support method according to claim 1, wherein
the video content is video content to be used as an educational material in a learning course, and
the method further comprises:
outputting first display data for a first screen including the video content to be browsed by the student of the learning course who corresponds to the user information; and
outputting second display data for a second screen including the video content to be browsed by a teacher of the learning course; wherein,
layouts of display data are different between the first display data and the second display data.

3. The content utilization support method according to claim 2, wherein
the second display data includes a graph indicating a play frequency by users for each section of the video content, and a mark at a position in the graph corresponding to the detected section whose play frequency is larger than the predetermined value.

4. The content utilization support method according to claim 3, wherein
the mark is changed according to at least one of a kind of attribute information associated with the detected section and a degree of bias between the first distribution and the second distribution.

5. The content utilization support method according to claim 3, wherein
the attribute information corresponding to the mark is displayed in response a selection of the mark on the second screen.

6. The content utilization support method according to claim 2, wherein
the first display data indicates the detected section and one or more kinds of attribute information whose difference between the first distribution and second distribution is larger than the predetermined threshold.

7. The content utilization support method according to claim 6, wherein
the first display data selectively indicates the detected section that corresponds to a specified attribute information, the specified attribute information corresponding to a user who requests outputting the first display data.

8. The content utilization support method according to claim 6, further comprising:
when an operation of changing a play position of the video content is detected and when a plurality of the detected sections are detected, playing the video content from the detected section whose play position is closest to the changed play position from among the plurality of the detected sections.

9. The content utilization support method according to claim 1, wherein
the play frequency is an average value of play frequencies by the users who have played sections of the video content.

10. The content utilization support method according to claim 1, wherein
when the number of kinds of attribute information associated with the detected section is larger than a predetermined number, selecting attribute information to be displayed from among the number of kinds of attribute information associated with the detected section.

11. The content utilization support method according to claim 10, wherein
the one or more kinds of attribute information includes performance of the users; and
the content utilization support method comprises:
selecting attribute information to be displayed, in descending order of degree of correlation with the performance of the users.

12. The content utilization support method according to claim 10, comprising:
selecting a higher-level attribute information as attribute information to be displayed, the higher-level attribute information including another type of attribute information.

13. The content utilization support method according to claim 10, comprising:
selecting attribute information to be displayed, in descending order of degree of difference between the first distribution and second distribution.

14. A non-transitory computer-readable recording medium storing a content utilization support program causes a computer to execute processing comprising:
detecting a section of video content based on operation information on the video content and user information, the detected section of the video content being a section of the video content whose play frequency by single user is more than a predetermined value, the operation information including a played section of the video content, the user information including a plurality of kinds of attribute information of the user who has played the played section of the video content;
identifying a first group of users whose play frequency of the detected section of the video content is greater than a predetermined value, and identifying a second group of users whose play frequency of the detected section of the video content is equal to or less than the predetermined value;
comparing, for each of the plurality of kinds of attribute information, a first distribution that is a distribution of attribute information of users in the identified first group of users and a second distribution that is a distribution of attribute information of users in the identified second group of users;
identifying the plurality of kinds of attribute information whose difference between the first distribution and the second distribution is larger than a predetermined threshold based on the comparing; and
outputting information that indicates the detected section and the plurality of kinds of attribute information whose difference between the first distribution and the second distribution is larger than the predetermined threshold.

15. A content utilization support apparatus comprising:
a memory; and a hardware processor coupled to the memory and configured to execute a process comprising:

detecting a section of video content based on operation information on the video content and user information, the detected section of the video content being a section of the video content whose play frequency by single user is more than a predetermined value, the operation information including a played section of the video content, the user information including a plurality of kinds of attribute information of the user who has played the played section of the video content;

identifying a first group of users whose play frequency of the detected section of the video content is greater than a predetermined value, and identifying a second group of users whose play frequency of the detected section of the video content is equal to or less than the predetermined value;

comparing, for each of the plurality of kinds of attribute information, a first distribution that is a distribution of attribute information of users in the identified first group of users and a second distribution that is a distribution of attribute information of users in the identified second group of users;

identifying the plurality of kinds of attribute information whose difference between the first distribution and the second distribution is larger than a predetermined threshold based on the comparing; and outputting information that indicates the detected section and the plurality of kinds of attribute information whose difference between the first distribution and the second distribution is larger than the predetermined threshold.

* * * * *